United States Patent
Tange et al.

(10) Patent No.: US 9,600,931 B2
(45) Date of Patent: Mar. 21, 2017

(54) INFORMATION PROCESSING DEVICE AND PROGRAM

(71) Applicant: Sony Corporation, Tokyo (JP)

(72) Inventors: Akira Tange, Tokyo (JP); Toshihiko Kawai, Kanagawa (JP); Atsushi Kuribayashi, Kanagawa (JP); Megumi Kikiuchi, Tokyo (JP); Shigefumi Tamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/415,278

(22) PCT Filed: Jun. 12, 2013

(86) PCT No.: PCT/JP2013/066161
§ 371 (c)(1),
(2) Date: Jan. 16, 2015

(87) PCT Pub. No.: WO2014/017200
PCT Pub. Date: Jan. 30, 2014

(65) Prior Publication Data
US 2015/0213642 A1    Jul. 30, 2015

(30) Foreign Application Priority Data

Jul. 25, 2012 (JP) ................................. 2012-164581

(51) Int. Cl.
*G06T 15/00* (2011.01)
*G06T 17/05* (2011.01)
(Continued)

(52) U.S. Cl.
CPC .......... *G06T 17/05* (2013.01); *G01C 21/3638* (2013.01); *G06F 3/011* (2013.01);
(Continued)

(58) Field of Classification Search
None
See application file for complete search history.

(56) References Cited

U.S. PATENT DOCUMENTS

2002/0123841 A1    9/2002  Satoh et al.
2010/0123737 A1    5/2010  Williamson et al.

FOREIGN PATENT DOCUMENTS

EP    1189176 A       3/2002
JP    03-136087       6/1991
(Continued)

OTHER PUBLICATIONS

Nishio, A On-Vehicle Navigation Device, Jun. 30, 1997, JP 09171348.*
(Continued)

*Primary Examiner* — Martin Mushambo
(74) *Attorney, Agent, or Firm* — Chip Law Group

(57) ABSTRACT

There is provided an information processing device including a control unit that controls generation of image information of three-dimensional space based on position information indicating a position of a terminal device and orientation information indicating an orientation of the terminal device, and an obtaining unit that obtains a request for a change related to the generation of the image information. The control unit controls the generation in a manner that first image information of the three-dimensional space corresponding to the position and the orientation is generated, and when obtaining the request, the control unit controls the generation in a manner that second image information of the three-dimensional space corresponding to the position, the orientation, and the change is generated.

18 Claims, 21 Drawing Sheets

(51) Int. Cl.
*G09B 29/00* (2006.01)
*G09B 29/10* (2006.01)
*G06F 3/01* (2006.01)
*G06T 19/00* (2011.01)
*G06T 19/20* (2011.01)
*G01C 21/36* (2006.01)

(52) U.S. Cl.
CPC ............ *G06T 19/003* (2013.01); *G06T 19/20* (2013.01); *G09B 29/007* (2013.01); *G09B 29/10* (2013.01)

(56) References Cited

FOREIGN PATENT DOCUMENTS

| JP | 03-136087 A | 6/1991 |
|---|---|---|
| JP | HEI03136087 A | 6/1991 |
| JP | 09-171348 | 6/1997 |
| JP | 09-171348 A | 6/1997 |
| JP | HEI09171348 A | 6/1997 |
| JP | 09-292830 | 11/1997 |
| JP | 09-292830 A | 11/1997 |
| JP | HEI09292830 A | 11/1997 |
| JP | 2001-059734 A | 3/2001 |
| JP | 2001059734 A | 3/2001 |
| JP | 2001-338037 A | 12/2001 |
| JP | 2001338037 A | 12/2001 |
| JP | 2002-168634 A | 6/2002 |
| JP | 2002168634 A | 6/2002 |
| JP | 2004-333155 A | 11/2004 |
| JP | 2004333155 A | 11/2004 |
| JP | 2007-156498 A | 6/2007 |
| JP | 2007156498 A | 6/2007 |
| JP | 2008-058282 A | 3/2008 |
| JP | 2008058282 A | 3/2008 |

OTHER PUBLICATIONS

Extended European Search Report Received for European Patent Application No. 13823831.6, Mailed on January 25, 2016, p. 8.
International Search Report corresponding to PCT/JP2013/066161, dated Jul. 16, 2013, 2 pgs.
Office Action Received for Chinese Patent Application No. 201380037970.2, mailed on Jun. 27, 2016, 26 pages of Office Action Including 15 Pages of English Translation.
Office Action for JP Patent Application No. 2014-526812, issued on Oct. 11, 2016, 04 pages of Office Action.
Office Action for EP Patent Application No. 13823831.6, issued on Oct. 18, 2016, 9 pages of Office Action.
"History of Microsoft Flight Simulator", Wikipedia, the free encyclopedia, pp. 01-12.
"Android Gyroscope Demonstration (LG G2x)", YouTube, 03 pages.

* cited by examiner

FIG. 6
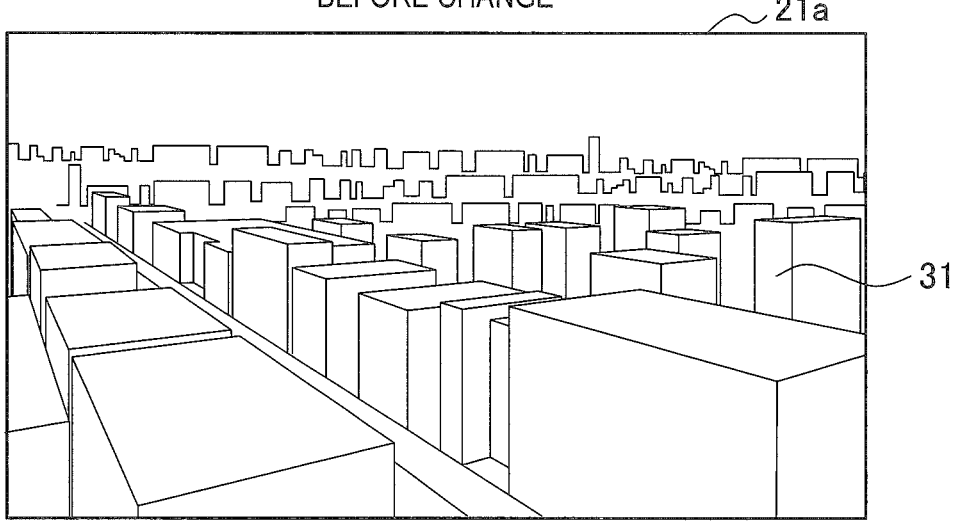
BEFORE CHANGE — 21a, 31
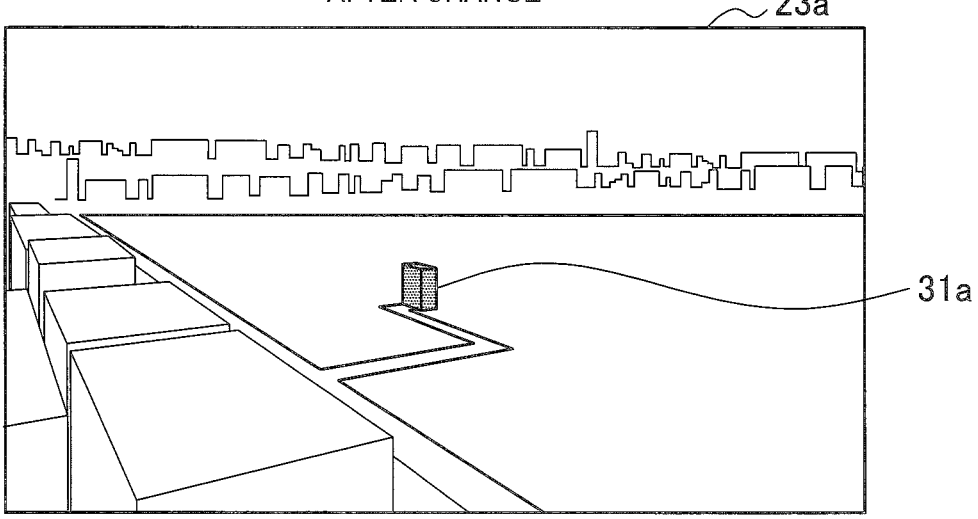
AFTER CHANGE — 23a, 31a

FIG. 7
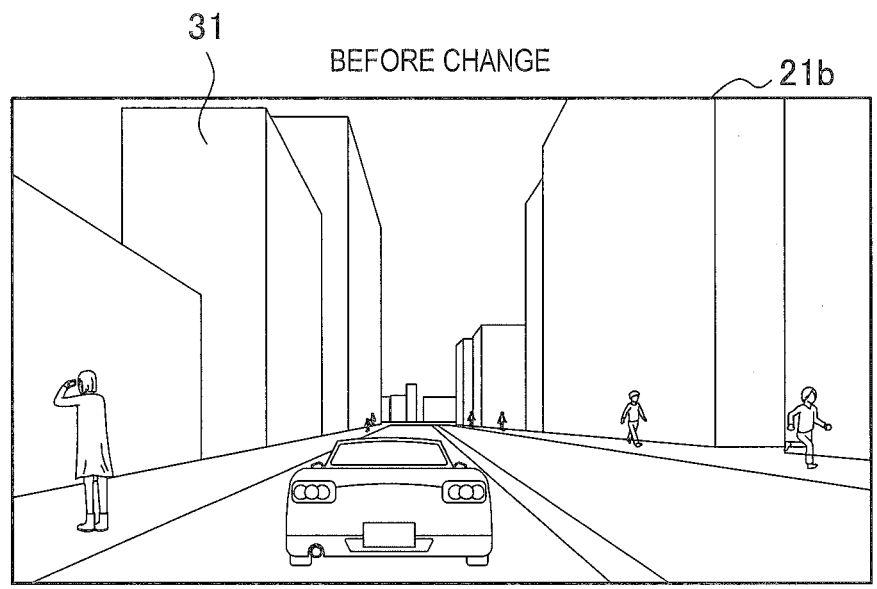
BEFORE CHANGE
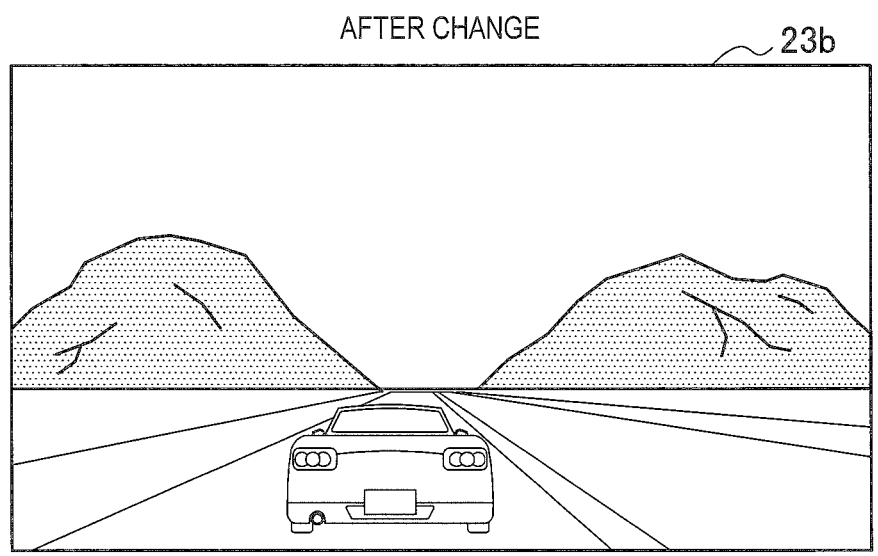
AFTER CHANGE

FIG. 8
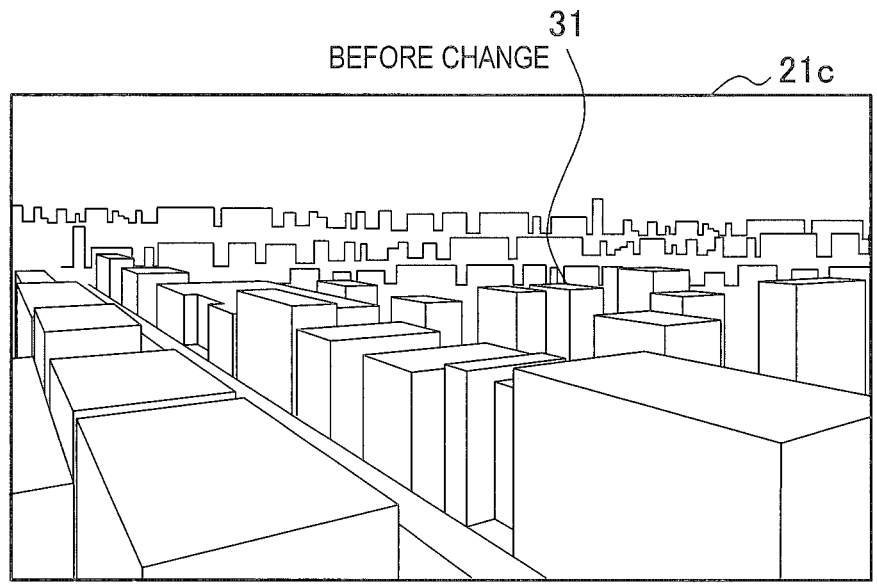
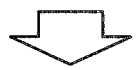
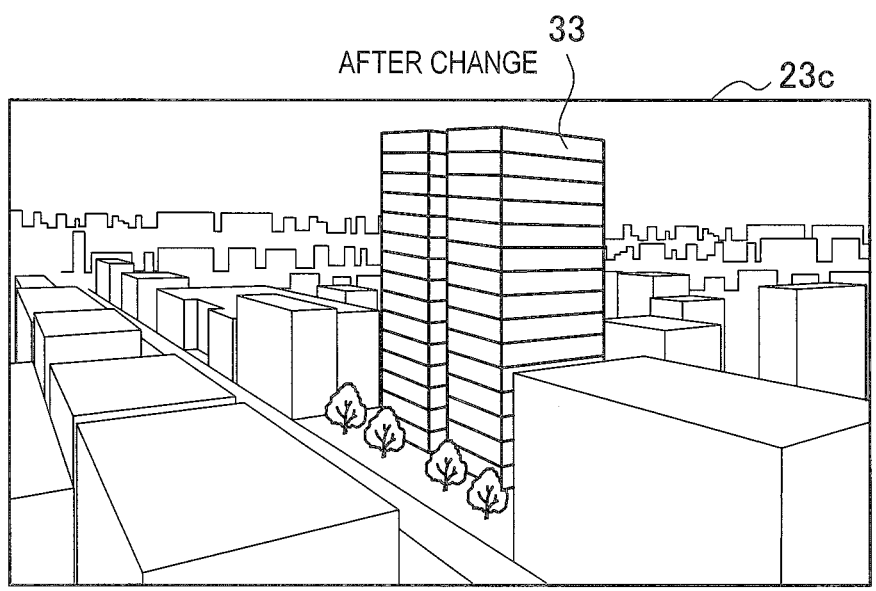

FIG. 9
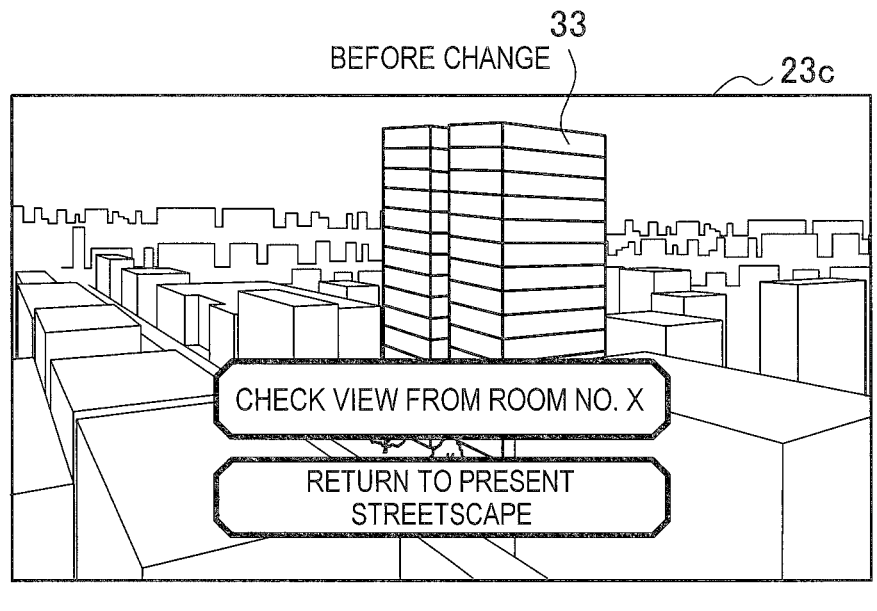
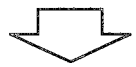
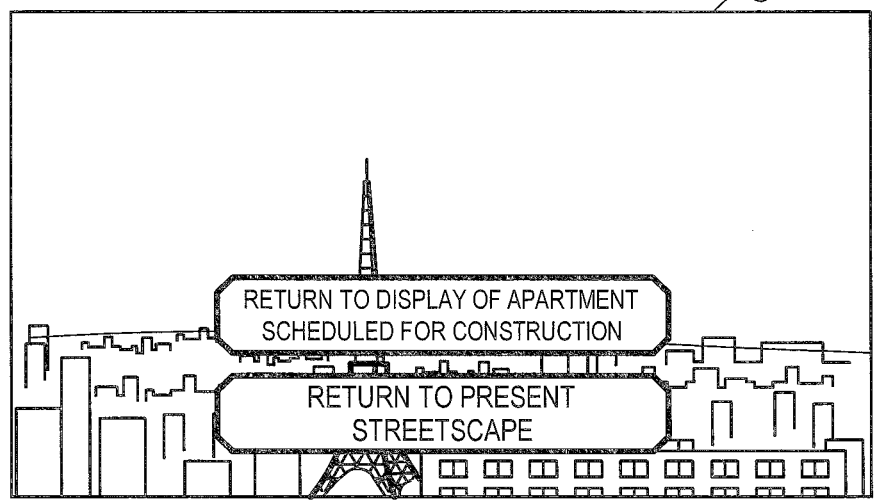

FIG. 10
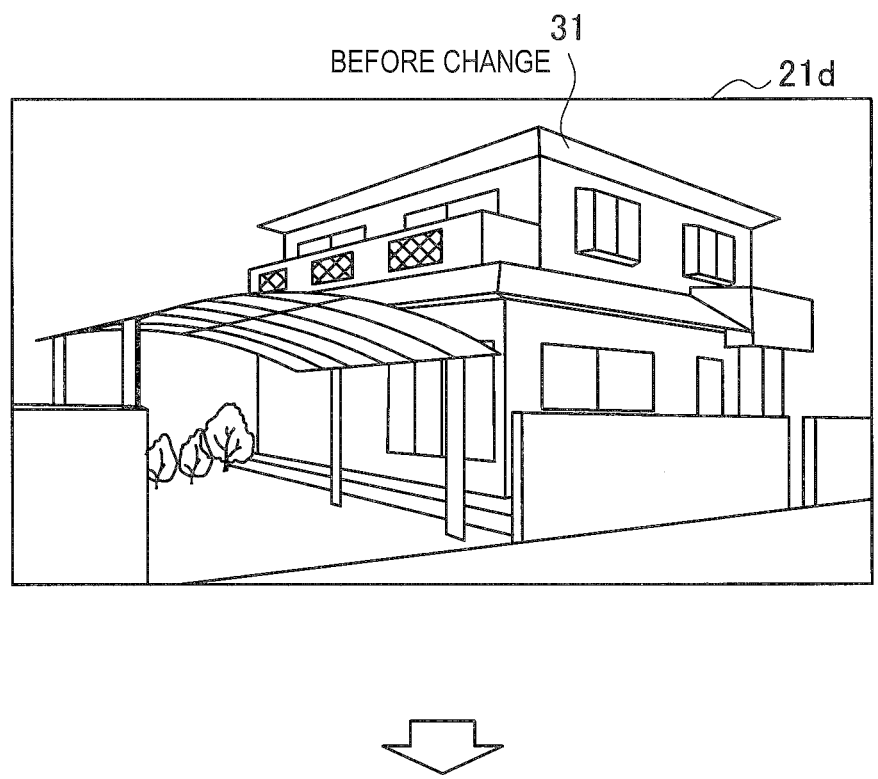
BEFORE CHANGE 31  21d
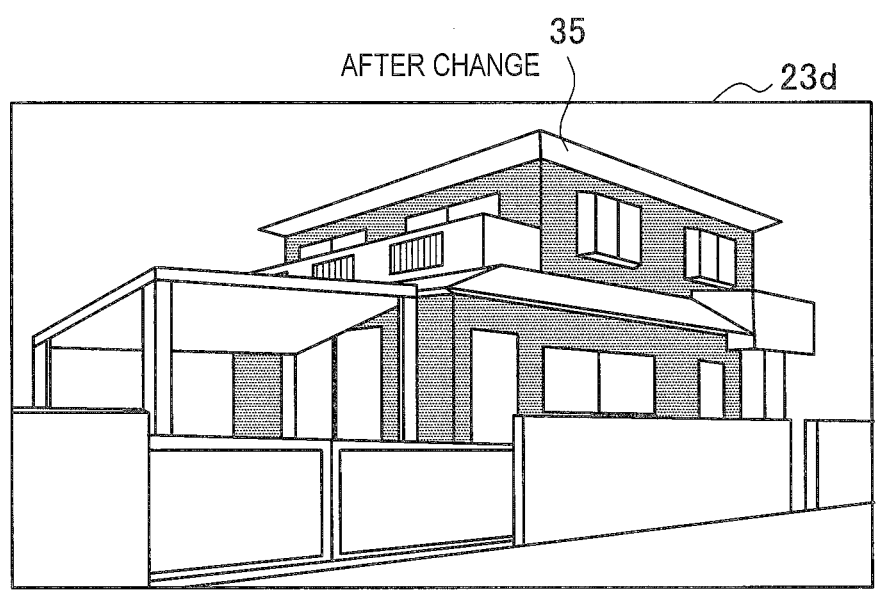
AFTER CHANGE 35  23d

FIG. 11
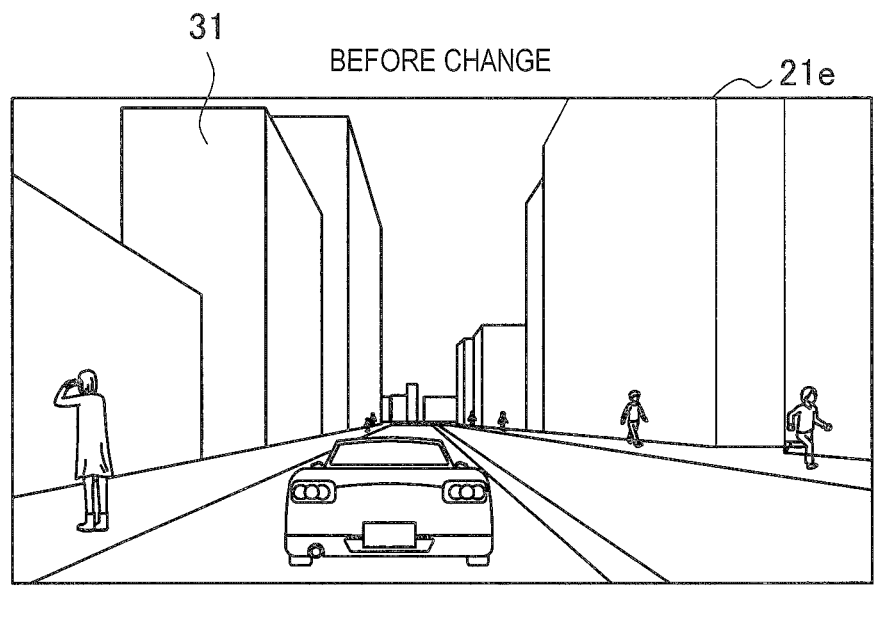
BEFORE CHANGE
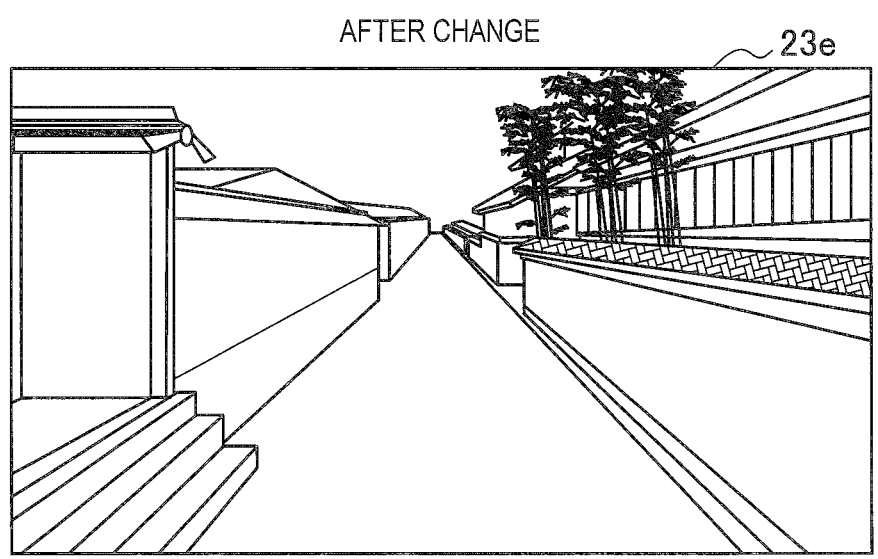
AFTER CHANGE

FIG. 12
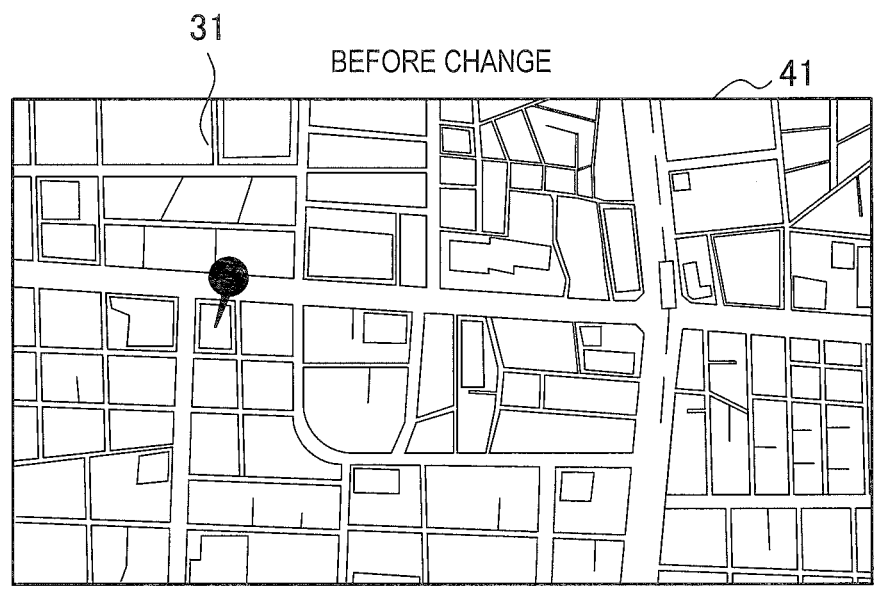
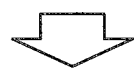
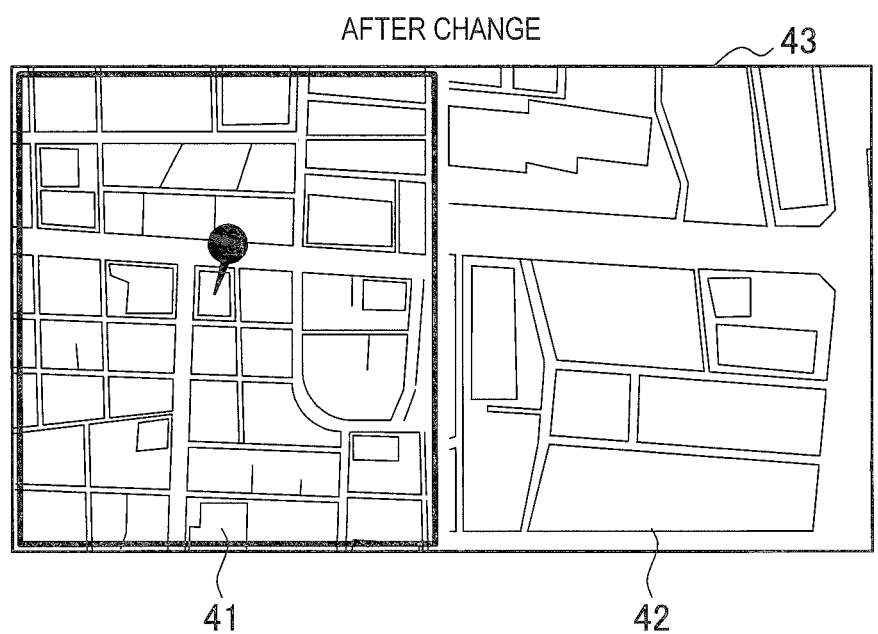

FIG. 19
AFTER CHANGE
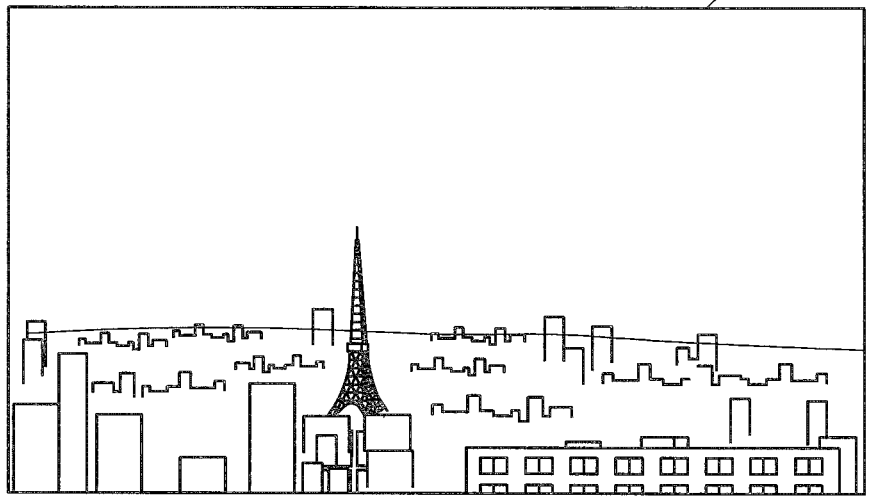
~23h
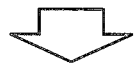
DURING EXECUTION OF FLIGHT
MODE
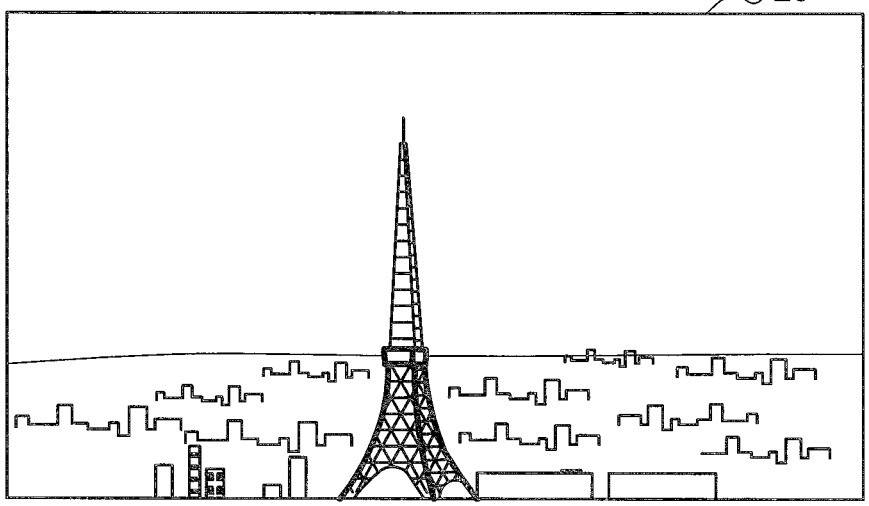
~29

FIG. 20
CIRCUMVENTION FLIGHT MODE
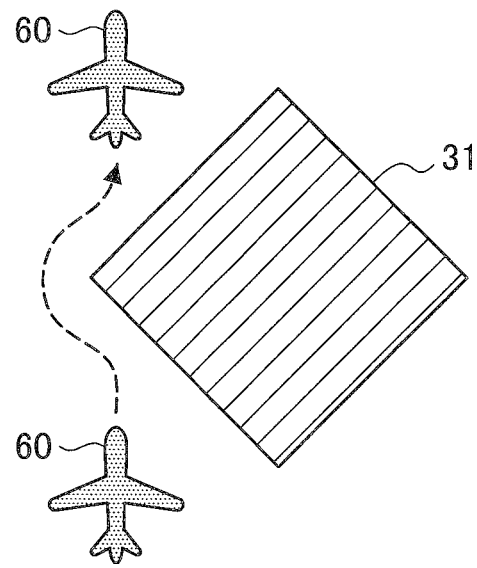
ENTRY FLIGHT MODE
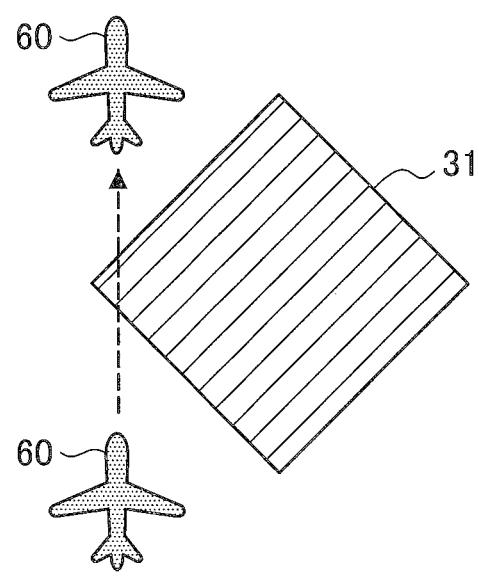

INFORMATION PROCESSING DEVICE AND PROGRAM

CROSS-REFERENCE TO RELATED APPLICATION

The present application is a national phase entry under 35 U.S.C. §371 of International Application No. PCT/JP2013/066161 filed Jun. 12, 2013, published on Jan. 30, 2014 as WO 2014/017200 A1, which claims priority from Japanese Patent Application No. JP 2012-164581 file in the Japanese Patent Office on Jul. 25, 2012.

TECHNICAL FIELD

The present disclosure relates to information processing devices and programs.

BACKGROUND ART

In recent years, image processing technologies using a computer have been widely used. Among the image processing technologies is a technique of generating an image of three-dimensional space. As an example, in three-dimensional computer graphics, a modeled object is placed in virtual three-dimensional space based on settings of a scene layout, and an image of the virtual three-dimensional space is generated by rendering.

The technique of generating an image of three-dimensional space is, for example, used in navigation systems. Specifically, some navigation systems can display an image similar to a scene which the user actually views as a three-dimensional map. For such navigation systems, various techniques of improving the usability for the user have been proposed.

For example, Patent Literature 1 discloses a technique of drawing a structural object located closer to the user than a point of interest, such as a target building, in a special form, such as a wire frame, translucent form, etc., in order to allow the user to easily recognize the object of interest and the surrounding environment.

CITATION LIST

Patent Literature

Patent Literature 1: JP 2004-333155A

SUMMARY OF INVENTION

Technical Problem

However, an image in which a structural object is drawn using a special technique is not similar to an image of a scene which the user actually views, and therefore, it may be difficult for the user to intuitively recognize a correspondence relationship between the image in which a structural object is drawn using a special technique and the scene which the user actually views. Therefore, although a structural object is drawn using a special technique in order to allow the user to recognize the object of interest, it may be difficult for the user to recognize where the object of interest is located in the actual scene.

Therefore, it is desirable to provide a way of allowing the user to view an image of a scene which the user desires to view, as the user desires, and also allowing the user to intuitively recognize a correspondence relationship between the image and a scene which the user actually views.

Solution to Problem

According to the present disclosure, there is provided an information processing device including a control unit that controls generation of image information of three-dimensional space based on position information indicating a position of a terminal device and orientation information indicating an orientation of the terminal device, and an obtaining unit that obtains a request for a change related to the generation of the image information. The control unit controls the generation in a manner that first image information of the three-dimensional space corresponding to the position and the orientation is generated, and when obtaining the request, the control unit controls the generation in a manner that second image information of the three-dimensional space corresponding to the position, the orientation, and the change is generated.

According to the present disclosure, there is provided a program causing a computer to function as a control unit that controls generation of image information of three-dimensional space based on position information indicating a position of a terminal device and orientation information indicating an orientation of the terminal device, and an obtaining unit that obtains a request for a change related to the generation of the image information. The control unit controls the generation in a manner that first image information of the three-dimensional space corresponding to the position and the orientation is generated, and when obtaining the request, the control unit controls the generation in a manner that second image information of the three-dimensional space corresponding to the position, the orientation, and the change is generated.

ADVANTAGEOUS EFFECTS OF INVENTION

As described above, according to the present disclosure, the user is allowed to view an image of a scene which the user desires to view, as the user desires, and the user is also allowed to intuitively recognize a correspondence relationship between the image and a scene which the user actually views.

BRIEF DESCRIPTION OF DRAWINGS

FIG. 6 is a diagram for describing an example image of three-dimensional space in which an object other than a target object has been removed from a partial region.

FIG. 7 is a diagram for describing an example image of three-dimensional space in which an object exceeding a predetermined height has been deleted.

FIG. 8 is a diagram for describing an example image of three-dimensional space in which an object included in a portion thereof has been replaced with another object.

FIG. 9 is a diagram for describing an example image of three-dimensional space which is viewed from a point in or in the vicinity of another object for replacement. Referring to FIG. 9, a changed image 23c and a new image 25 are shown.

FIG. 10 is a diagram for describing an example image of three-dimensional space in which a portion of an individual object has been changed.

FIG. 11 is a diagram for describing an example image of three-dimensional space, where present three-dimensional space has been changed to past three-dimensional space.

FIG. 12 is a diagram for describing example map information of three-dimensional space in which a partial region has been maintained while the other region has been simplified.

FIG. 19 is a diagram for describing an example image of three-dimensional space which is viewed from at least one different point of view to which a changed point of view is further transitioned.

FIG. 20 is a diagram for describing an example mode of transition of a point of view from a changed point of view.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that the description will be given in the following order.
1. Schematic Configuration of Information Processing System
2. First Embodiment
  2.1. Configurations of Devices
    2.1.1. Configuration of Server
    2.1.2. Configuration of Terminal Device
  2.2. Flow of Process
  2.3. Specific Example Changes in Three-Dimensional Space
    2.3.1. Deletion or Addition of Object Satisfying Condition
    2.3.2. Replacement of Object
    2.3.3. Partial Change in Object
    2.3.4. Change to Three-Dimensional Space Corresponding to Different Time
    2.3.5. Production of Map Based on Behavior History
3. Second Embodiment
  3.1. Configurations of Devices
    3.1.1. Configuration of Server
    3.1.2. Configuration of Terminal Device
  3.2. Flow of Process
  3.3. Specific Example Changes in Point Of View
    3.3.1. Change between Two-Dimensional Map and Three-Dimensional Map
    3.3.2. Change between Point of View Similar to User's One and Higher Point of View
4. Hardware Configurations
  4.1. Hardware Configuration of Server
  4.2. Hardware Configuration of Terminal Device <<<1. Schematic Configuration of Information Processing System>>>

Figure 1:
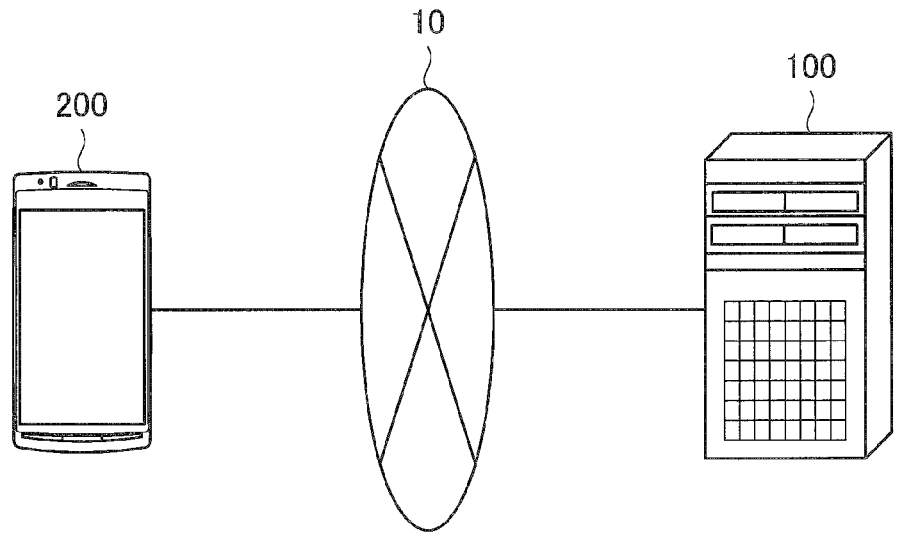
FIG. 1 is a diagram for describing an example schematic configuration of an information processing system according to an embodiment of the present disclosure.

Firstly, a schematic configuration of an information processing system according to an embodiment of the present disclosure will be described with reference to FIG. 1. FIG. 1 is a diagram for describing the example schematic configuration of the information processing system according to the embodiment of the present disclosure. Referring to FIG. 1, the information processing system includes a server 100 and a terminal device 200.

(Server 100)

The server 100 controls generation of image information of three-dimensional space. As an example, the image information is three-dimensional map information. For example, the server 100 generates the image information under its own control. Thereafter, the server 100 provides the generated image information to the terminal device 200 through a network 10. The network 10 includes, for example, a wired network and a wireless network.

More specifically, for example, the server 100 receives position information indicating a position of the terminal device 200 and orientation information indicating an orientation of the terminal device 200. Thereafter, the server 100 controls generation of image information of three-dimensional space based on the received position information and orientation information. Specifically, the server 100, when generating the image information on its own, generates image information of three-dimensional space (e.g., three-dimensional map information) based on the received position information and orientation information. Thereafter, the server 100 sends the generated image information to the terminal device 200 through the network 10.

(Terminal Device 200)

The terminal device 200 is a device which is used by the user. As an example, the terminal device 200 is a smartphone. The terminal device 200 obtains image information generated under the control of the server 100, and displays an image on a display unit using the image information. As an example, the image information is three-dimensional map information as described above, and the image is a three-dimensional map.

More specifically, for example, the terminal device 200 detects position information indicating a position of the terminal device 200 and orientation information indicating an orientation of the terminal device 200, and sends these items of information to the server 100. Thereafter, the terminal device 200 receives image information (e.g., three-dimensional map information) which is generated based on the position information and the orientation information. Thereafter, the terminal device 200 displays an image (e.g., a three-dimensional map) on a display unit using the image information. As an example, such an image is an image which is similar to a scene which the user actually views.

Embodiments of the present disclosure allow the user to view an image of a scene which the user of the terminal device 200 desires to view, as the user desires, and also allow the user to intuitively recognize a correspondence relationship between the image and the scene which the user actually views. Embodiments of the present disclosure will now be described in detail in <<<2. First Embodiment>>> and <<<3. Second Embodiment>>>.

<<<2. First Embodiment>>>

Firstly, a first embodiment of the present disclosure will be described. According to the first embodiment of the present disclosure, first image information of three-dimensional space corresponding to the position and orientation of the terminal 100 is generated. Second image information of three-dimensional space corresponding to the position and orientation of the terminal 100, that has been partially or entirely changed, is also generated in response to a request. As a result, the user of the terminal device 200 is allowed to view an image of three-dimensional space which is partially or entirely different from real space, i.e., edited three-dimensional space, as an image of a scene which the user desires to view, as the user desires. Also, the user of the terminal device 200 is allowed to view an image of three-dimensional space similar to real space, i.e., non-edited three-dimensional space, as an image similar to a scene which the user actually views. Therefore, the user of the terminal device 200 is allowed to intuitively recognize a correspondence relationship between the image of the edited three-dimensional space and the scene which the user actually views, based on the image of the non-edited three-dimensional space. As a result, the user is allowed to view the image of the edited three-dimensional space with a feeling close to real space.

The first embodiment will now be described in the order of <<2.1. Configurations of Devices>>, <<2.2. Flow of Process>>, and <<2.3. Specific Example Changes in Three-Dimensional Space>>.

<<2.1. Configurations of Devices>>

Figure 2:
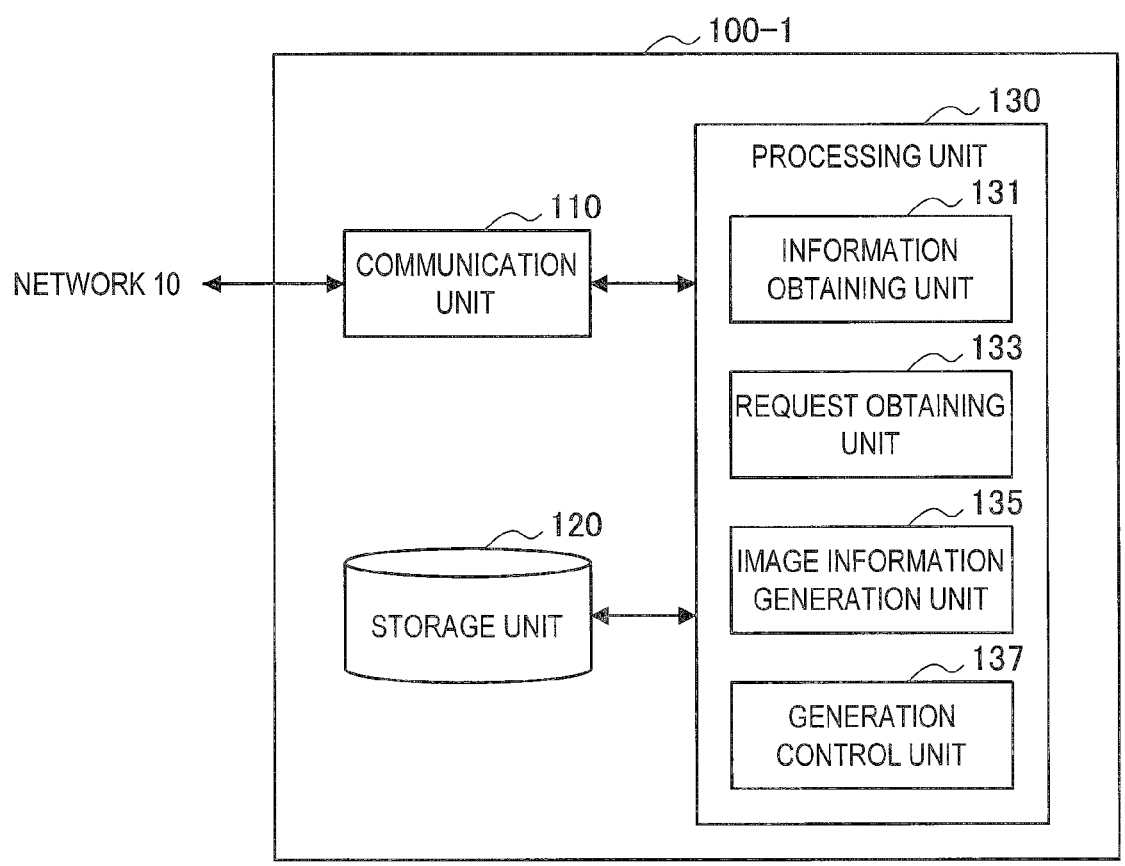
FIG. 2 is a block diagram showing an example configuration of a server according to a first embodiment.
Figure 3:
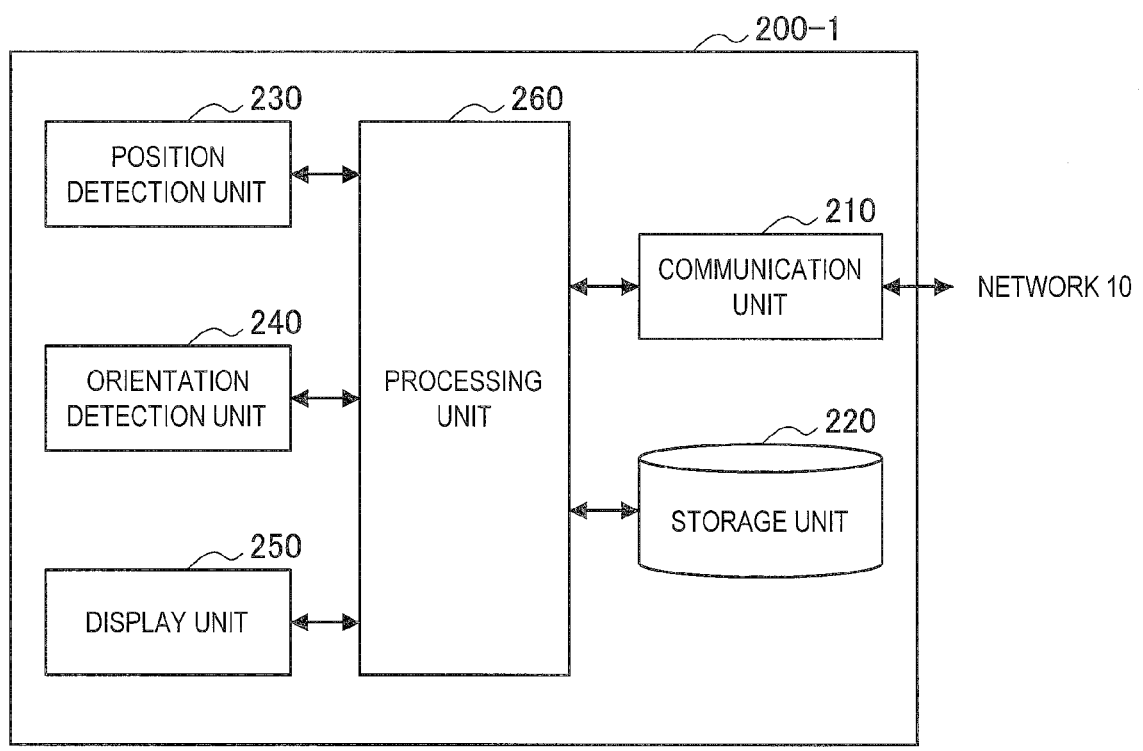
FIG. 3 is a block diagram showing an example configuration of a terminal device according to the first embodiment.

An example configuration of a server 100-1 and a terminal device 200-1 according to the first embodiment will be described with reference to FIGS. 2 and 3.

<2.1.1. Configuration of Server>

An example configuration of the server 100-1 according to the first embodiment will be described with reference to FIG. 2. FIG. 2 is a block diagram showing the example configuration of the server 100-1 according to the first embodiment. Referring to FIG. 2, the server 100-1 includes a communication unit 110, a storage unit 120, and a processing unit 130.

(Communication Unit 110)

The communication unit 110 communicates with another device. For example, the communication unit 110 communicates with the terminal device 200-1 through the network 10.

(Storage Unit 120)

The storage unit 120 temporarily or permanently stores information which should be held in the server 100-1. For example, the storage unit 120 stores a program and data for operating the server 100-1.

Also, for example, the storage unit 120 stores information which is needed when the processing unit 130 generates image information of three-dimensional space. For example, the image information includes image information of three-dimensional computer graphics (hereinafter referred to as 3DCG). In this case, the storage unit 120 stores information about a modeled object, information about the position of the object in virtual three-dimensional space, etc. Also, the image information may include image information obtained by image capture in real space, or image information obtained by processing that image information. In this case, the storage unit 120 stores the image information obtained by image capture and information related thereto (e.g., the position and orientation of a camera during image capture).

Also, for example, the storage unit 120 stores information about a change in all or a portion of three-dimensional space. For example, the image information includes image information of three-dimensional computer graphics (hereinafter referred to as 3DCG). In this case, for example, the storage unit 120 stores information about an object which is newly placed by the above change (e.g., information or arrangement information of the object), information about an object which is deleted by the above change (e.g., a deletion condition), information about an object which is changed by the above change (e.g., information of the object after change), etc.

(Processing Unit 130)

The processing unit 130 provides various functions of the server 100-1. The processing unit 130 includes an information obtaining unit 131, a request obtaining unit 133, an image information generation unit 135, and a generation control unit 137.

(Information Obtaining Unit 131)

The information obtaining unit 131 obtains position information indicating the position of the terminal device 200-1 and orientation information indicating the orientation of the terminal device 200-1. When the communication unit 110 receives the position information and the orientation information, the information obtaining unit 131 obtains the position information and the orientation information.

The position information includes, for example, longitude information and latitude information of the terminal device 200-1. In other words, the position information includes two-dimensional coordinate information of the terminal device 200-1. Also, the position information may further include altitude information (information of a height in the vertical direction) of the terminal device 200-1. In other words, the position information may include three-dimensional coordinate information of the terminal device 200-1.

The orientation information includes, for example, information indicating an azimuth of the terminal device 200-1. In other words, the orientation information includes information of a two-dimensional orientation of the terminal device 200-1. As an example, the azimuth is an azimuth of the back of a display surface of the terminal device 200-1. Assuming that the user is positioned in front of the display surface of the terminal device 200-1, the azimuth corresponds to an azimuth of the user's point of view. Also, the orientation information may include information indicating a tilt of the terminal device 200-1 with respect to the vertical direction. In other words, the orientation information may include information of a three-dimensional orientation of the terminal device 200-1.

(Request Obtaining Unit 133)

The request obtaining unit 133 obtains a request for a change related to generation of image information of three-dimensional space based on the position information and the orientation information (hereinafter referred to as a "change request"). More specifically, for example, when the terminal device 200-1 sends the change request to the server 100-1, the communication unit 110 receives the change request. Thereafter, the request obtaining unit 133 obtains the change request.

In the first embodiment, the change is a change in all or a portion of three-dimensional space. The change request is, for example, information which triggers a predetermined change in three-dimensional space. As an example, the change is deletion of an object within the range of three-dimensional space which is automatically determined based on the position and orientation of the terminal device 200-1, and the change request triggers the deletion.

Also, for example, three-dimensional space before change is three-dimensional space which is similar to real space, i.e., non-edited three-dimensional space. On the other hand, three-dimensional space after change is, for example, three-dimensional space which is partially or entirely different from real space, i.e., edited three-dimensional space. In other words, to change three-dimensional space is to cause non-edited three-dimensional space to be edited three-dimensional space.

Also, for example, the request obtaining unit 133 may obtain a request to cancel the change (hereinafter referred to as a "cancel request").

Note that the change request may be information which not only triggers a predetermined change in three-dimensional space, but also specifies specific details of a change in three-dimensional space. For example, the change request may be information which specifies one of various types of changes in three-dimensional space described in <<2.3. Specific Example Changes in Three-Dimensional Space>> below. Also, the change request may be information which specifies specific details of a certain type of change in three-dimensional space. For example, when the change is deletion of an object in three-dimensional space, the change request may be information which specifies what object is to be deleted.

Also, conversely to the above example, three-dimensional space after change may be the non-edited three-dimensional space, and three-dimensional space before change may be the edited three-dimensional space. In other words, a change in three-dimensional space may be to change (restore) edited three-dimensional space to non-edited three-dimensional space.

(Image Information Generation Unit 135)

The image information generation unit 135 generates image information under the control of the generation control unit 137. For example, the image information generation unit 135 generates image information of three-dimensional space.

—Image Information of Three-Dimensional Space—

The image information of three-dimensional space is, for example, two-dimensional image data about three-dimensional space which has a predetermined image format. The image format is any image format such as, for example, JPEG (Joint Photographic Experts Group), GIF (Graphics Interchange Format), PNG (Portable Network Graphics), etc.

Also, the above three-dimensional space is, for example, virtual three-dimensional space which copies real space. Also, the above image information includes two-dimensional image data of 3DCG. For example, the image information generation unit 135 sets a point of view (camera) for rendering in virtual three-dimensional space in which a modeled object is placed, and performs rendering, to generate two-dimensional image data of 3DCG.

Also, the above image information may include, in addition to two-dimensional image data of 3DCG, two-dimensional image data obtained by capturing an image in real space (hereinafter referred to as captured image data), or two-dimensional image data generated from the captured image data. Specifically, captured image data, or two-dimensional image data generated from the captured image data, may be used as virtual image information of three-dimensional space which copies real space, instead of two-dimensional image data of 3DCG. In this case, for example, the image information generation unit 135 generates the image information by selecting corresponding captured image data of stored captured image data. Alternatively, for example, the image information generation unit 135 selects some pieces of captured image data of the stored captured image data, and processes the selected captured image data using a technique, such as morphing, etc., to generate the above image information.

Also, the image information may include, in addition to two-dimensional image data of 3DCG, other two-dimensional image data related to real space (e.g., two-dimensional image data of a two-dimensional map). Specifically, as virtual image information of three-dimensional space which copies real space, other two-dimensional image data related to real space may be used instead of two-dimensional image data of 3DCG. In this case, for example, the image information generation unit 135 generates or selects the above other two-dimensional image data stored to generate the above image information.

In the foregoing, the example image information of three-dimensional space has been described. Of course, the image information is not limited to this example.

For example, the above three-dimensional space may be real space instead of virtual three-dimensional space which copies real space. In other words, three-dimensional space which copies real space may not be prepared. And, the above image information may not include two-dimensional image data of 3DCG, and may be captured image data, two-dimensional image data generated from the captured image data, or other two-dimensional image data related to real space.

Also, for example, image information of three-dimensional space may not be the above two-dimensional image data, and may be data which is needed to generate two-dimensional data. As an example, the above image information may be data before rendering of virtual three-dimensional space which copies real space (e.g., three-dimensional space data after setting of a scene layout). Also, as another example, the above image information may be captured image data selected before being processed using a technique such as morphing, etc.

—Generation of Reference Image Information—

Also, the image information generation unit 135 generates an image of three-dimensional space based on position information indicating the position of the terminal device 200-1 and orientation information indicating the orientation of the terminal device 200-1, under the control of the generation control unit 137. For example, the image information generation unit 135 generates first image information (hereinafter referred to as "reference image information") of three-dimensional space corresponding to the position and orientation of the terminal device 200-1. More specifically, for example, the reference image information is image information of three-dimensional space which is viewed from a point of view corresponding to the position and orientation of the terminal device 200-1.

As an example, the image information generation unit 135 specifies a position and an orientation in virtual three-dimensional space which copies real space, that correspond to the position and orientation of the terminal device 200, based on the position information and orientation information of the terminal device 200. Next, the image information generation unit 135 sets a point of view for rendering (camera) at the specified position and orientation. Thereafter, the image information generation unit 135 performs rendering to generate two-dimensional image data of 3DCG as image information. For example, thus, image information of three-dimensional space is generated which is viewed from a point of view similar to the point of view of the user of the terminal device 200-1.

—Generation of Changed Image Information—

Also, for example, the image information generation unit 135 generates second image information (hereinafter referred to as "changed image information") of three-dimensional space which corresponds to the position and orientation of the terminal device 200-1 and a change in a change request. In the first embodiment, the changed image information is image information of three-dimensional space after change which corresponds to the position and orientation of the terminal device 200-1. Also, more specifically, for example, the above changed image information is image information of three-dimensional space after change which is viewed from a point of view corresponding to the position and orientation of the terminal device 200-1.

As an example, the image information generation unit 135 changes all or a portion of three-dimensional space. Thereafter, for example, the image information generation unit 135 generates image information of three-dimensional space after change which is viewed from a point of view similar to the point of view of the user of the terminal device 200-1, as the changed image information, a in the case of the above reference image information. Note that specific changes in three-dimensional space will be described in <<2.3. Specific Example Changes in Three-Dimensional Space>> below As described above, for example, three-dimensional space before change is three-dimensional space which is similar to real space, i.e., non-edited three-dimensional space, and three-dimensional space after change is, for example, three-dimensional space which is partially or entirely different from real space, i.e., edited three-dimensional space. In this case, the reference image information corresponds to an image which is similar to a scene which the user actually views, and the changed image information corresponds to an image of a scene which the user desires to view.

Note that, as described above, three-dimensional space after change may be the above non-edited three-dimensional space, and three-dimensional space before change may be the above edited three-dimensional space. In this case, the reference image information may correspond to an image of a scene which the user desires to view, and the changed image information may correspond to a scene which the user actually views.

(Generation Control Unit 137)

The generation control unit 137 controls generation of image information. For example, the generation control unit 137 controls generation of image information of three-dimensional space which is performed by the image information generation unit 135.

More specifically, the generation control unit 137 controls generation of image information of three-dimensional space based on position information indicating the position of the terminal device 200-1 and orientation information indicating the orientation of the terminal device 200-1. For example, the generation control unit 137, when the information obtaining unit 131 obtains the position information and the orientation information, causes the image information generation unit 135 to generate image information of three-dimensional space based on the position information and the orientation information.

For example, the generation control unit 137 controls the above generation so that first image information of three-dimensional space (i.e., the above reference image information) corresponding to the above position and the above orientation, is generated. For example, the generation control unit 137 controls the above generation so that the reference image information is generated, until the above change request is obtained or until another of the above change request is obtained after the above cancel request is obtained. Note that the generation control unit 137 may not generate the reference image information, or may generate the reference image information, until the above cancel request is obtained after the above change request is obtained.

Also, for example, the generation control unit 137, when receiving the above change request, controls the above generation so that second image information of three-dimensional space (i.e., the above changed image information) corresponding to the position and orientation of the terminal device 200-1 and a change in a change request, is generated. For example, the generation control unit 137 controls the above generation so that the changed image information is generated, until the above cancel request is obtained after the above change request is obtained.

As described above, one of the reference image information and changed image information corresponds to an image similar to a scene which the user actually views, and the other of the reference image information and changed image information corresponds to an image of a scene which the user desires to view. In other words, the user of the terminal device 200-1 is allowed to view both an image similar to a scene which the user views and an image of a scene which the user desires to view, as the user desires, by a request. The user of the terminal device 200-1 is allowed to intuitively recognize a correspondence relationship between a scene which the user views and an image similar to the scene, by viewing the scene which the user views and the image of the scene. Also, the user is allowed to intuitively recognize a correspondence relationship between an image of a scene which the user desires to view and a scene which the user actually views, by viewing an image similar to a scene which the user views and an image of a scene which the user desires to view while changing these images. As a result, the user is allowed to view an image of a scene which the user desires to view with a feeling close to real space.

In particular, in the first embodiment, the user of the terminal device 200-1 is allowed to view an image of three-dimensional space which is partially or entirely different from real space, i.e., edited three-dimensional space, as an image of a scene which the user desires to view, as the user desires. In other words, the user is allowed to view an image of edited three-dimensional space with a feeling close to real space. Note that specific changes in three-dimensional space will be described in <<2.3. Specific Example Changes in Three-Dimensional Space>> below.

Note that, as described above, the above change request is, for example, information which triggers a predetermined change in three-dimensional space. In this case, for example, the generation control unit 137 notifies the image information generation unit 135 of a change in three-dimensional space, or notifies the image information generation unit 135 of canceling of the change, to control the above generation. Also, the above change request may be information which specifies specific details of a change in three-dimensional space. In this case, for example, the generation control unit 137 may control the above generation by notifying the image information generation unit 135 of specific details of a change of three-dimensional space.

<2.1.2. Configuration of Terminal Device>>

An example configuration of the terminal device 200-1 according to the first embodiment will be described with reference to FIG. 3. FIG. 3 is a block diagram showing the example configuration of the terminal device 200-1 according to the first embodiment. Referring to FIG. 3, the terminal device 200-1 includes a communication unit 210, a storage unit 220, a position detection unit 230, an orientation detection unit 240, a display unit 250, and a processing unit 260.

(Communication Unit 210)

The communication unit 210 communicates with another device. For example, the communication unit 210 communicates with the server 100-1 through the network 10.

(Storage Unit 220)

The storage unit 220 temporarily or permanently stores information which should be held in the terminal device 200-1. For example, the storage unit 220 stores a program and data for an operation of the terminal device 200-1.

(Position Detection Unit 230)

The position detection unit 230 detects position information indicating the position of the terminal device 200-1. As described above, the above position information includes, for example, longitude information and latitude information of the terminal device 200-1. In other words, the above position information includes two-dimensional coordinate information of the terminal device 200-1.

Also, as described above, the above position information may further include altitude information (information of a height in the vertical direction) of the terminal device 200-1. In other words, the above position information may include three-dimensional coordinate information of the terminal device 200-1.

(Orientation Detection Unit 240)

The orientation detection unit 240 detects orientation information indicating the orientation of the terminal device 200-1. As described above, the above orientation information includes, for example, information indicating an azimuth of the terminal device 200-1. In other words, the above orientation information includes two-dimensional orientation information of the terminal device 200-1. As an example, the above azimuth is an azimuth of the back of a display surface of the terminal device 200-1. Assuming that the user of the terminal device 200-1 is positioned in front of the display surface of the terminal device 200-1, the above azimuth corresponds to an azimuth of the user's point of view.

Also, the above orientation information may include information indicating a tilt in the vertical direction of the terminal device 200-1. In other words, the above orientation information may include information of a three-dimensional orientation of the terminal device 200-1.

(Display Unit 250)

The display unit 250 displays an image under the control of the processing unit 260. For example, the display unit 250 displays an image using image information of three-dimensional space generated by the server 100-1 under the control of the processing unit 260.

(Processing Unit 260)

The processing unit 260 provides various functions of the terminal device 200-1.

For example, the processing unit 260 provides position information indicating the position of the terminal device 200-1 and orientation information indicating the orientation of the terminal device 200-1 to the server 100-1. More specifically, the processing unit 260 obtains the position information from the position detection unit 230, and obtains the orientation information from the orientation detection unit 240. Thereafter, the processing unit 260 causes the communication unit 210 to send the above position information and the above orientation information to the server 100-1.

Also, for example, the processing unit 260, when detecting a predetermined user operation, generates the above change request. For example, the processing unit 260, when detecting a predetermined user operation through an input unit (not shown) such as a touchscreen or button, generates the above change request. Alternatively, the processing unit 260, when detecting a user operation, such as the user's operation of swinging the terminal device 200-1 up and down or left and right, using any sensor, may generate the above change request. Thus, various operations by the user may be applied as the above predetermined user operation. Thereafter, the processing unit 260 causes the communication unit 210 to send the above change request thus generated to the server 100-1.

As described above, for example, the above change request is information which triggers a predetermined change in three-dimensional space. In this case, for example, the processing unit 260 generates predetermined invariable information as the change request.

Also, the above change request may be information which specifies specific details of a change in three-dimensional space as described above. In this case, as an example, the processing unit 260 may generate variable information including specific details of a change in three-dimensional space. The specific details of a change in three-dimensional space are, for example, the type of the change and/or specific change details of a change in a certain type of three-dimensional space. For example, the processing unit 260 determines specific details of a change in three-dimensional space based on the result of detection of the user's operation.

Also, for example, the processing unit 260 obtains image information generated by the server 100-1, and causes the display unit 250 to display an image using the image information.

For example, the reference image information is sent from the server 100-1 to the terminal device 200-1 until the above change request is sent to the server 100-1, or until another of the above change request is sent after the above cancel request is sent to the server 100-1. The processing unit 260 obtains the reference image information from the communication unit 210 which has received the reference image information. Thereafter, the processing unit 260 causes the display unit 250 to display an image using the reference image information.

Also, for example, until the above cancel request is sent after the above change request is sent, the changed image information is sent from the server 100-1 to the terminal device 200-1. The processing unit 260 obtains the changed image information from the communication unit 210 which has received the changed image information. Thereafter, the processing unit 260 causes the display unit 250 to display an image using the changed image information.

<<2.2. Flow of Process>>

Next, an example information process according the first embodiment will be described with reference to FIGS. 4 and 5.

(Process of Server 100-1)

Figure 4:
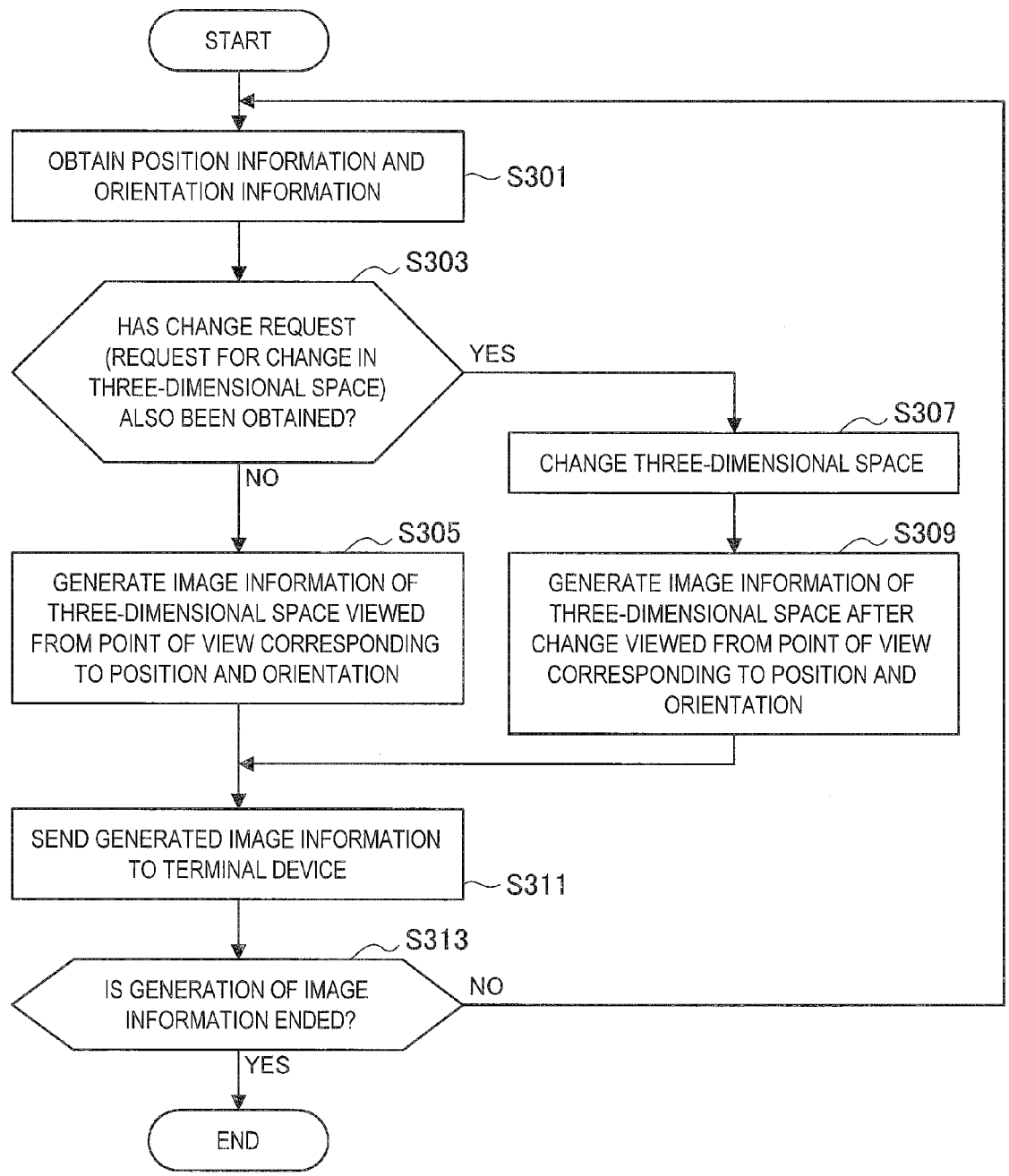
FIG. 4 is a flowchart showing an example schematic flow of an information process of a server according to the first embodiment.

FIG. 4 is a flowchart showing an example schematic flow of an information process of the server 100-1 according to the first embodiment.

Initially, in step S301, the information obtaining unit 131 obtains position information indicating the position of the terminal device 200-1 and orientation information indicating the orientation of the terminal device 200-1. Thereafter, in step S303, the generation control unit 137 determines whether or not a change request has also been obtained by the request obtaining unit 133. The change request is a request to change all or a portion of three-dimensional space. If the change request has been obtained, the process proceeds to step S307. Otherwise, the process proceeds to step S305.

In step S305, the image information generation unit 135 generates image information (i.e., the reference image information) of three-dimensional space which is viewed from a point of view corresponding to the position and orientation of the terminal device 200-1 under the control of the generation control unit 137.

In step S307, the image information generation unit 135 changes all or a portion of three-dimensional space under the control of the generation control unit 137. Thereafter, in step S309, the image information generation unit 135 generates image information (i.e., changed image information) of three-dimensional space after change which is viewed from a point of view corresponding to the position and orientation of the terminal device 200-1.

In step S311, the communication unit 110 sends the generated image information to the terminal device 200-1.

In step S313, the processing unit 130 determines whether to end the generation of image information. If the generation of image information is ended, the process ends. Otherwise, the process returns to step S301.

(Process of Terminal Device 200-1)

Figure 5:
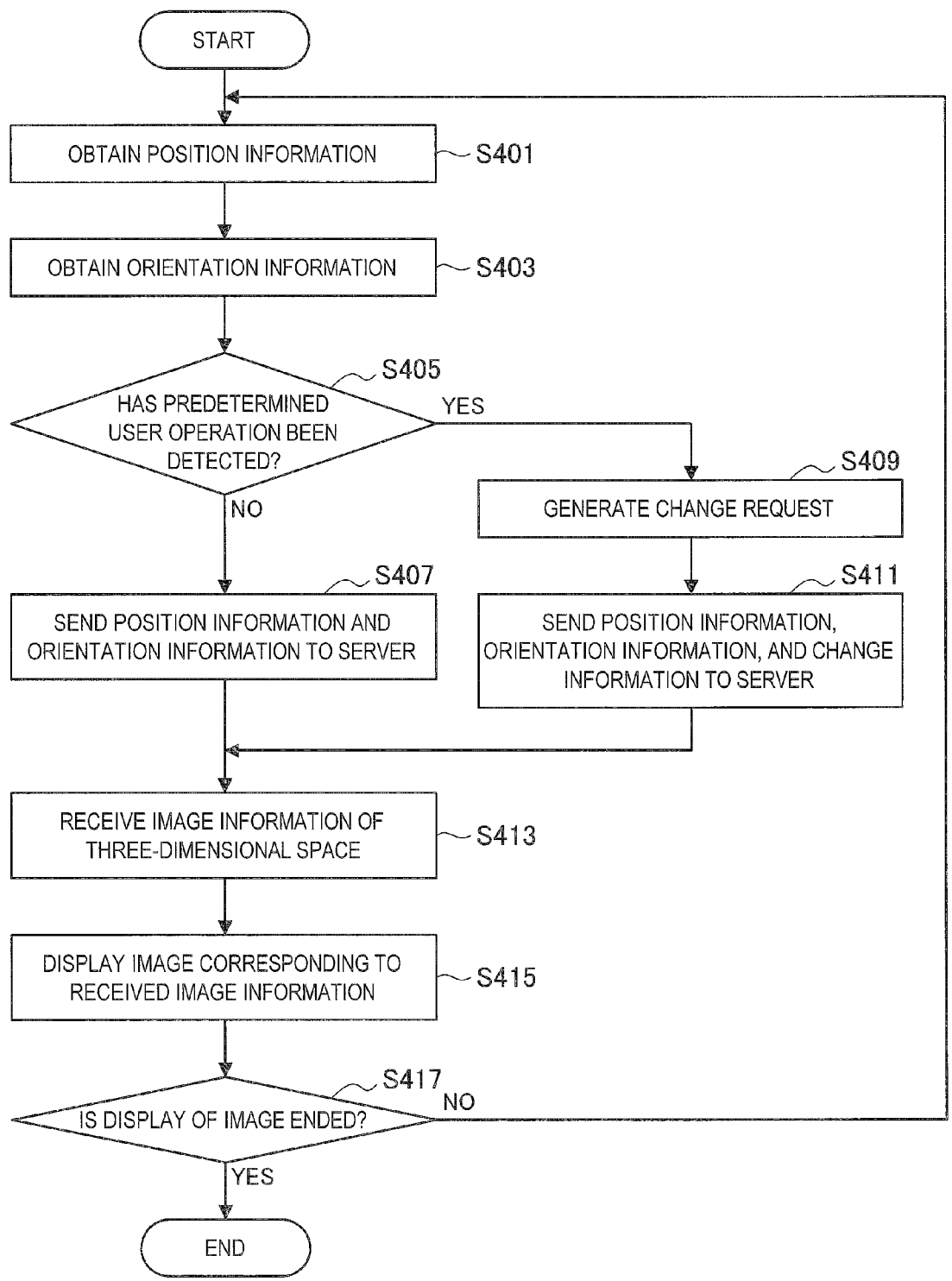
FIG. 5 is a block diagram showing an example configuration of a terminal device according to the first embodiment.

FIG. 5 is a flowchart showing a schematic example flow of an information process of the terminal device 200-1 according to the first embodiment.

In step S401, the processing unit 260 obtains position information indicating the position of the terminal device 200-1 from the position detection unit 230. Also, in step S403, the processing unit 260 obtains orientation information indicating the orientation of the terminal device 200-1 from the orientation detection unit 240. Also, in step S405, the processing unit 260 determines whether or not a predetermined user operation corresponding to a change request has been detected. If the predetermined user operation has been detected, the process proceeds to step S409. Otherwise, the process proceeds to step S407.

In step S407, the processing unit 260 causes the communication unit 210 to send the above position information and the above orientation information to the server 100-1.

In step S409, the processing unit 260 generates a change request. The change request is a request to change all or a portion of three-dimensional space. Thereafter, in step S411, the processing unit 260 causes the communication unit 210 to send the above position information, the above orientation information, and the above change request to the server 100-1.

In step S413, the communication unit 210 receives image information of three-dimensional space generated by the server 100-1. Thereafter, in step S415, the processing unit 260 obtains the above image information, and causes the display unit 250 to display an image using the image information. As a result, the display unit 250 displays the image.

In step S417, the processing unit 260 determines whether to end the display of the image. If the display of the image is ended, the process ends. Otherwise, the process returns to step S401.

<<2.3. Specific Example Changes in Three-Dimensional Space>>

Next, first to fifth specific example changes in three-dimensional space will be described with reference to FIGS. 6-12. Note that a change in three-dimensional space refers to, for example, addition, deletion, or change of an object included in the above three-dimensional space. The examples of the change are described as the first to third specific examples.

<2.3.1. Deletion or Addition of Object Satisfying Condition>

As the first example, a change in three-dimensional space is to delete an object satisfying a condition, of objects included in all or a portion of three-dimensional space. The object includes, for example, an object corresponding to a building.

As an example, the above object satisfying a condition is an object other than a target object. A change in three-dimensional space in this case will be specifically described with reference to FIG. 6.

FIG. 6 is a diagram for describing an example image of three-dimensional space in which an object other than a target object has been removed from a partial region. Referring to FIG. 6, an image (hereinafter referred to as a "reference image") 21a of three-dimensional space before change and an image (hereinafter referred to as a "changed image") 23a of three-dimensional space after change.

In this example, three-dimensional space before change is three-dimensional space which is similar to real space. Therefore, the reference image 21a is, for example, an image similar to a scene which the user views. In the reference image 21a, as in a scene which the user actually views, a building which is a destination (i.e., a existing target object 31a) is hidden by the surrounding buildings. Therefore, the user of the terminal device 200-1 is not allowed to recognize the destination building and the surrounding environment.

On the other hand, three-dimensional space after change is a three-dimensional space from which a portion of the objects has been deleted. In the changed image 23a, objects surrounding the existing target object 31a corresponding to the destination building (or, objects located between the set point of view and the existing target object 31a) have been deleted. Therefore, the user of the terminal device 200-1 is allowed to recognize the destination building and the surrounding environment. Such a changed image 23a is considered to be one of images of scenes which the user desires to view.

Thus, an object other than a target object is deleted, and therefore, the user of the terminal device 200-1 is allowed to recognize the target object (e.g., a destination) and the surrounding environment. Also, the user is allowed to intuitively recognize a correspondence relationship between the changed image 23a and a scene which the user views, through the reference image 21a which is an image similar to the scene which the user views. As a result, the user is allowed to view a target object (e.g., a destination) and the surrounding environment in the changed image 23a with a feeling close to real space.

Also, as another example, the above object satisfying a condition is an object which exceeds a predetermined height. The object is, for example, an object corresponding to a building. A change in three-dimensional space in this case will be specifically described with reference to FIG. 7.

FIG. 7 is a diagram for describing an example image of three-dimensional space in which an object exceeding a predetermined height has been deleted. Referring to FIG. 7, a reference image 21b and a changed image 23b are shown.

In this example, three-dimensional space before change is three-dimensional space which is similar to real space. Therefore, the reference image 21b is, for example, an image similar to a scene which the user views. In the reference image 21b, as in a scene which the user actually views, the user is not allowed to view objects in the far distance due to surrounding high buildings. Therefore, the user is not allowed to recognize a landscape in the far distance.

On the other hand, three-dimensional space after change is three-dimensional space from which a portion of objects has been deleted. In the changed image 23b, an existing object 31 corresponding to a high building (e.g., a building having a height of at least 10 m) has been deleted. Therefore, the user of the terminal device 200-1 is allowed to recognize a landscape in the far distance. Such a changed image 23b is considered to be one of images of scenes which the user desires to view.

Thus, an object exceeding a predetermined height is deleted, and therefore, the user of the terminal device 200-1 is allowed to recognize a scenery in the far distance. Also, the user is allowed to intuitively recognize a correspondence relationship between the changed image 23b and a scene which the user views, through the reference image 21b which is an image similar to the scene which the user views. As a result, the user is allowed to view a scenery in the far distance in the changed image 23b with a feeling close to real space.

In the foregoing, as the first example, a case where a change in three-dimensional space is to delete an object satisfying a condition of objects included in all or a portion of three-dimensional space, has been described. The present disclosure is not limited to the first example. For example, three-dimensional space before change and three-dimensional space after change may be interchanged with respect to the above example. Specifically, as the first example, a change in three-dimensional space may be to add an object satisfying a condition to all or a portion of three-dimensional space in which that object satisfying a condition has not been placed. Thus, in the first example, one of three-dimensional space before change and three-dimensional space after change is three-dimensional space in which an object satisfying a condition has not been deleted, and the other is three-dimensional space in which that object satisfying a condition has been deleted.

<2.3.2. Replacement of Object>

As a second example, a change in three-dimensional space is to replace an object included in a portion of three-dimensional space with another object. The object includes, for example, an object which is a building. A change in three-dimensional space in this case will be specifically described with reference to FIG. 8.

FIG. 8 is a diagram for describing an example image of three-dimensional space in which an object included in a portion thereof has been replaced with another object. Referring to FIG. 8, a reference image 21c and a changed image 23c are shown.

In this example, three-dimensional space before change is three-dimensional space which is similar to real space. Therefore, the reference image 21c is, for example, an image similar to an image of a scene which the user views. In a certain region of the reference image 21c, there is an existing object 31 corresponding to an existing building (e.g., an office building).

On the other hand, three-dimensional space after change is three-dimensional space in which an object included in a portion thereof has been replaced with another object. In the changed image 23c, the above existing object 31 in the above region has been replaced with a new object 33 corresponding to a new building (e.g., an apartment scheduled for construction). Therefore, the user of the terminal device 200-1 is allowed to recognize a scene that a new building will have been constructed. Such a changed image 23c is considered to be one of images of scenes which the user desires to view.

Thus, an object included in a portion of three-dimensional space is replaced with another object. Therefore, the user of the terminal device 200-1 is allowed to recognize how a scene will be changed if an envisaged change is made in real space. Also, the user is allowed to intuitively recognize a correspondence relationship between the changed image 23c and a scene which the user views, through the reference image 21c which is an image of the scene which the user views. As a result, the user is allowed to view a scene in which an envisaged change will have been made in the changed image 23c with a feeling close to real space.

Note that, of course, conversely to the example described with reference to FIG. 8, three-dimensional space after change may be three-dimensional space which is similar to real space, and three-dimensional space before change may be three-dimensional space in which an object included in a portion thereof has been replaced with another object.

Also, the generation control unit 137 may further control generation of image information of three-dimensional space after change which is viewed from a point of view which is located in or in the vicinity of the above another object for replacement. An image which the user is allowed to view in this case will be specifically described with reference to FIG. 9.

FIG. 9 is a diagram for describing an example image of three-dimensional space which is viewed from a point in or in the vicinity of the another object for replacement. Referring to FIG. 9, the changed image 23c and a new image 25 are shown.

The changed image 23c is as described with reference to FIG. 8. In this case, for example, options for additional images to be displayed are displayed in the changed image 23c. For example, an option that "CHECK VIEW FROM ROOM NO. X" is provided. For example, if this option is selected, the image information generation unit 135 sets a point of view at a position in the new object 33 corresponding to the Xth floor of the apartment scheduled for construction, under the control of the generation control unit 137. Thereafter, the image information generation unit 135 generates image information of three-dimensional space which is viewed from the point of view. As a result, the new image 25 of a scene which will be viewed from the Xth floor of the apartment scheduled for construction, is displayed on the terminal device 200-1.

Note that if another option that "RETURN TO PRESENT STREETSCAPE" is selected, the terminal device 200-1 generates a cancel request. As a result, the reference image information is generated, and as a result, the reference image 21c shown in FIG. 8 is displayed on the terminal device 200-1. Also, the new image 25 has options. If an option that "RETURN TO DISPLAY OF APARTMENT SCHEDULED FOR CONSTRUCTION" is selected, the changed image 23c is displayed on the terminal device 200-1. Also, if the option "RETURN TO PRESENT STREETSCAPE" is selected, the reference image 21c is displayed on the terminal device 200-1.

<2.3.3. Partial Change in Object>

As a third example, a change in three-dimensional space is to change a portion of an individual object included in three-dimensional space. The object includes, for example, an object which is a building. A change in three-dimensional space in this case will be specifically described with reference to FIG. 10.

FIG. 10 is a diagram for describing an example image of three-dimensional space in which a portion of an individual object has been changed. Referring to FIG. 10, a reference image 21d and a changed image 23d are shown.

In this example, three-dimensional space before change is three-dimensional space which is similar to real space. Therefore, the reference image 21d is, for example, an image which is similar to a scene which the user views. The reference image 21d includes an existing object 31 corresponding to an existing building (e.g., a house).

On the other hand, three-dimensional space after change is three-dimensional space in which a portion of an individual object has been changed. The changed image 23d includes a changed object 35 (e.g., a house after renovation) which has been obtained by partially changing the above existing object 31 of the reference image 21d. Therefore, the user of the terminal device 200-1 is allowed to recognize a scene in which a portion of a building has been changed. Such a changed image 23d is considered to be one of images of scenes which the user desires to view (e.g., an image of a scene after renovation).

Thus, a portion of an individual object in three-dimensional space is changed. Therefore, the user of the terminal device 200-1 is allowed to recognize how a scene will be changed if an envisaged change is made in real space. Also, the user is allowed to intuitively recognize a correspondence relationship between the changed image 23a and a scene which the user views, through the reference image 21a which is an image of the scene which the user views. As a result, the user is allowed to view a scene in which an envisaged change will have been made in the changed image 23a with a feeling close to real space.

Note that, of course, conversely to the example described with reference to FIG. 10, three-dimensional space after change may be three-dimensional space which is similar to real space, and three-dimensional space before change may be three-dimensional space in which a portion of an individual object has been changed.

<2.3.4. Change to Three-Dimensional Space Corresponding to Different Time>

As a fourth example, a change in three-dimensional space is a change from three-dimensional space corresponding to first time to three-dimensional space corresponding to second time. A change in three-dimensional space in this time will be specifically described with reference to FIG. 11.

FIG. 11 is a diagram for describing an example image of three-dimensional space, where present three-dimensional space has been changed to past three-dimensional space. Referring to FIG. 11, a reference image 21e and a changed image 23e are shown.

In this example, three-dimensional space before change is present three-dimensional space which is similar to real space. Therefore, the reference image 21a is, for example, an image similar to an image of a scene which the user views. In the reference image 21a, there is an existing object 31 corresponding to an existing building or the like.

On the other hand, three-dimensional space after change is past three-dimensional space. The past three-dimensional space is, for example, three-dimensional space which copies past real space. Therefore, the user of the terminal device 200-1 is allowed to recognize a past scene. Such a changed image 23e is considered to be one of images of scenes which the user desires to view.

Thus, three-dimensional space is changed from the three-dimensional space corresponding to first time to the three-dimensional space corresponding to second time, and therefore, the user of the terminal device 200-1 is allowed to recognize what the three-dimensional space was like in the past or what the three-dimensional space will be like in the future. Also, the user is allowed to intuitively recognize a correspondence relationship between the changed image 23a and a scene which the user views, through the reference image 21a which is an image similar to the scene which the user views. As a result, the user is allowed to view a past or future scene in the changed image 23a with a feeling close to real space.

Note that, of course, conversely to the example described with reference to FIG. 11, three-dimensional space after change may be present three-dimensional space which is similar to real space, and three-dimensional space before change may be past (or future) three-dimensional space.

<2.3.5. Production of Map Based on Behavior History>

As a fifth example, a change in three-dimensional space is to maintain a first region (hereinafter referred to as a "maintained region") including a position corresponding to the position of a terminal device 100, of the three-dimensional space, and simplify a second region (hereinafter referred to as a "simplified region") other than the above partial region, of the above three-dimensional space. And, the reference image information is map information of three-dimensional space corresponding to the position and orientation of the terminal device 100, and the changed image information is map information of three-dimensional space after change corresponding to the position and orientation of the terminal device 100. Also, the above maintained region is, for example, determined based on the history of accumulated positions of the terminal device 200-1. A change in three-dimensional space in this case will be specifically described with reference to FIG. 12.

FIG. 12 is a diagram for describing example map information of three-dimensional space in which a partial region has been maintained while the other region has been simplified. Referring to FIG. 12, map information 41 of three-dimensional space before change and map information 43 of three-dimensional space after change are shown. The map information is, for example, data before rendering of virtual three-dimensional space which copies real space (e.g., data of three-dimensional space after setting a scene layout).

In this example, the three-dimensional space before change is three-dimensional space which is similar to real space. Also, the map information 41 of three-dimensional space before change is map information which allows the user to view details of all regions.

On the other hand, the three-dimensional space after change is three-dimensional space in which the other region than the maintained region has been simplified. Therefore, the map information 41 of three-dimensional space after change is map information which allows the user to view details of the maintained region, but does not allow the user to view details of the simplified region. As an example, in the simplified region, main objects, such as a landmark place, a road having at least a predetermined width, etc., are left, while the other objects are deleted.

Here, for example, the server 100-1 accumulates the history of positions of the terminal device 200. And, based on the history, of regions surrounding the current position of the terminal device 200, a region including a position which frequently appears in the history is determined as the above maintained region. As a result, map information after change is map information which allows the user to view details of a region where the user of the terminal device 200-1 frequently passes, and does not allow the user to view a region where the user does not very frequently pass.

The map information of three-dimensional space which copies real space, that is thus generated, can, for example, be used in a game. For example, the map information can be used as map information for a game which uses, as a stage, three-dimensional space which copies real space. Also, the above map information is data of three-dimensional space, which is used as data of three-dimensional space for a game (a stage for a game). Specifically, map information and/or a stage for a game can be provided which allows the user to view details of a region which is familiar to the user, and does not allow the user to view details of a region which is not familiar to the user. As a result, a game can be provided which provides realistic experiences based on the user's experiences.

Note that the above map information after change may be generated separately from the above first embodiment. For example, the map information after change may be generated separately from generation of the map information before change. In addition, the map information after change may be generated irrespective of the current position and orientation of the terminal device 200-1. For example, a maintained region and a simplified region may be determined in the map information before change based on the history of accumulated positions of the terminal device 200-1. And, virtual three-dimensional space in which the maintained region has been maintained and the simplified region has been simplified may be generated, and data of the three-dimensional space may be generated as the map information after change.

<<<3. Second Embodiment>>>

Next, a second embodiment of the present disclosure will be described. According to the second embodiment of the present disclosure, first image information of three-dimensional space which is viewed from a first point of view corresponding to the position and orientation of a terminal 100, is generated. Also, second image information of three-dimensional space which is viewed from a second point of view corresponding to the position and orientation of the terminal 100, is generated. As a result, the user of the terminal device 200 is allowed to view an image of a scene from a different point of view corresponding to the current position and orientation of the user, as an image of a scene which the user desires to view, as the user desires, instead of an image similar to a scene which the user views. Also, the user of the terminal device 200 is allowed to view an image similar to a scene which the user actually views. Therefore, the user of the terminal device 200 is allowed to intuitively recognize a correspondence relationship between an image of a scene from a different point of view and a scene which the user actually views, through an image similar to the scene which the user actually views. As a result, the user is allowed to view an image of a scene from a different point of view with a feeling close to real space.

The second embodiment will now be described in the order of <<3.1. Configurations of Devices>>, <<3.2. Flow of Process>>, and <<3.3. Specific Example Changes in Point of View>>.

<<3.1. Configurations of Devices>>

Figure 13:
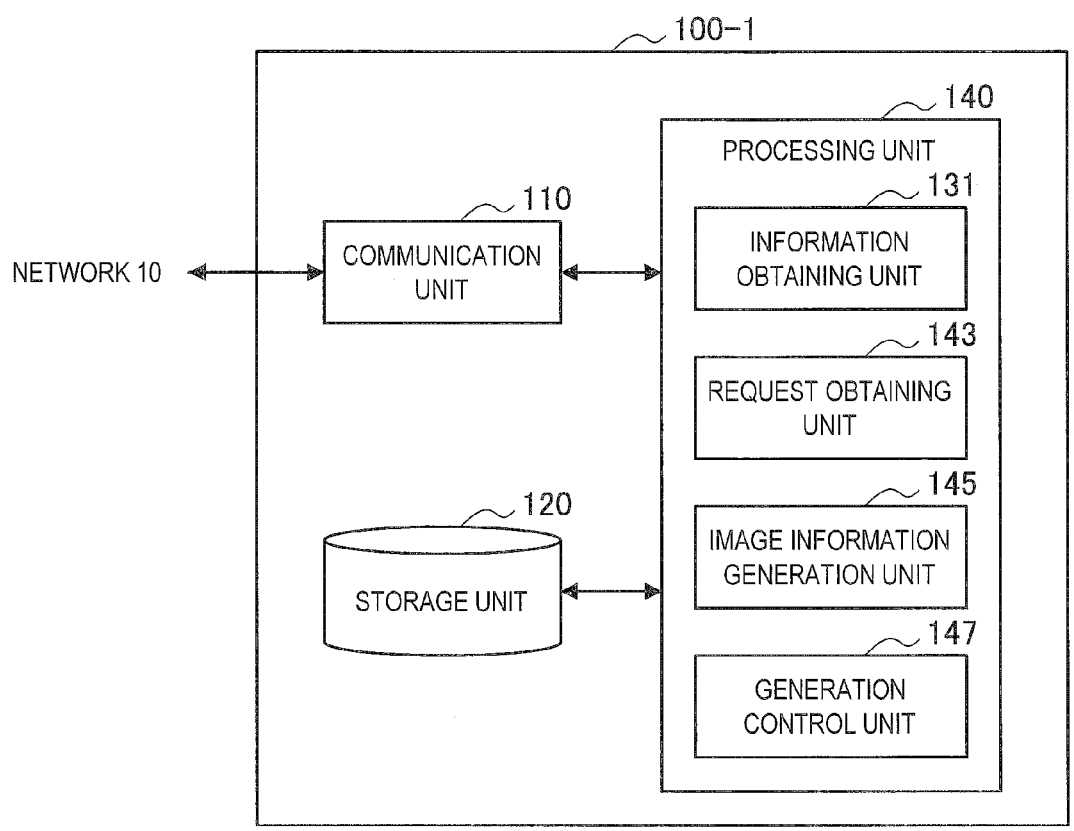
FIG. 13 is a block diagram showing an example configuration of a server according to a second embodiment.
Figure 14:
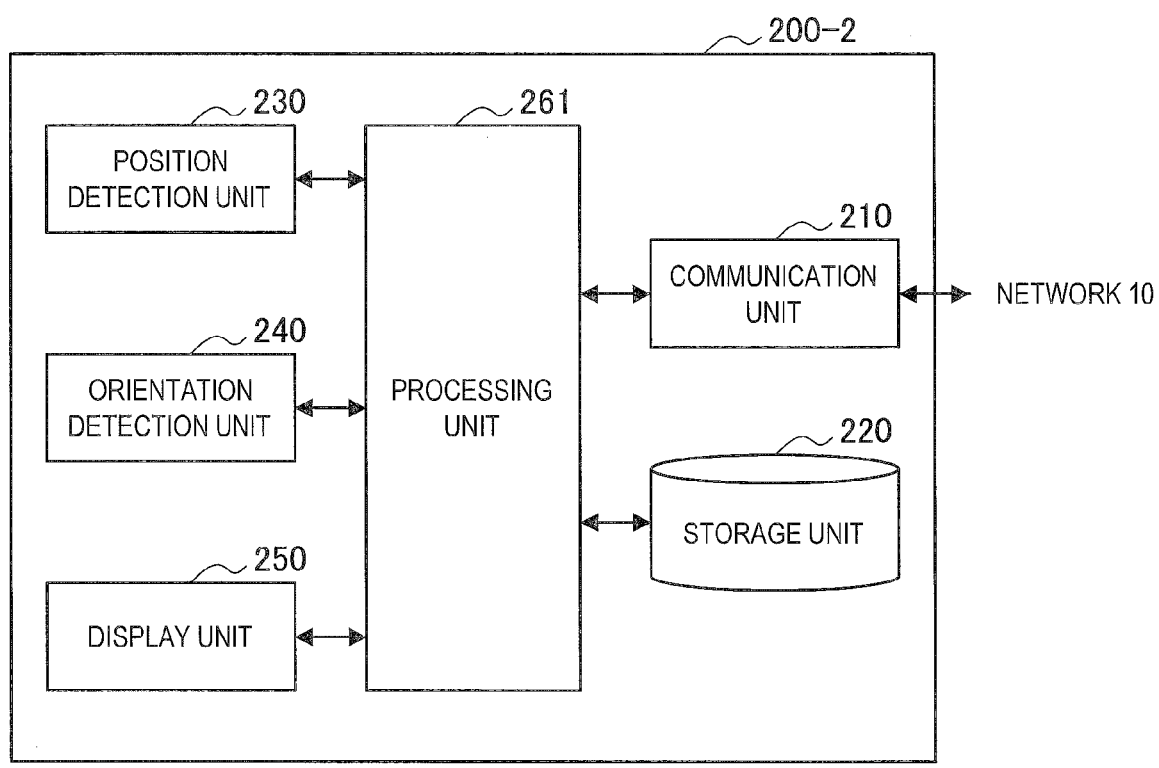
FIG. 14 is a block diagram showing an example configuration of a terminal device according to the second embodiment.

Example configurations of a server 100-2 and a terminal device 200-2 according to the second embodiment will be described with reference to FIGS. 13 and 14.

<3.1.1. Configuration of Server>>

An example configuration of the server 100-2 according to the second embodiment will be described with reference to FIG. 13. FIG. 13 is a block diagram showing an example configuration of the server 100-2 according to the second embodiment. Referring to FIG. 13, the server 100-2 includes a communication unit 110, a storage unit 120, and a processing unit 140.

Here, there is not a difference in the communication unit 110 and the storage unit 120 between the first embodiment and the second embodiment. Therefore, here, the processing unit 140, more specifically, a request obtaining unit 143, an image information generation unit 145, and a generation control unit 147, which are different from the request obtaining unit 133, the image information generation unit 135, and the generation control unit 137 of the first embodiment, will be described.

(Request Obtaining Unit 143)

The request obtaining unit 133 obtains a request for a change related to generation of image information of three-dimensional space based on the position information and the orientation information (that is, change request). More specifically, in a way similar to the first embodiment, for example, when the terminal device 200-2 sends the change request to the server 100-2, the communication unit 110 receives the change request. Thereafter, the request obtaining unit 143 obtains the change request.

In the second embodiment, the above change is a change in a point of view for generating image information of three-dimensional space. The above change request is, for example, information which triggers a predetermined change in the point of view. As an example, the above change is a change in the point of view which is automatically determined based on the position and orientation of the terminal device 200-1, and the above change request triggers a change in the point of view.

Also, for example, a point of view before change is a point of view corresponding to the position and orientation of the terminal device 200, i.e., a point of view which is similar to the user's point of view. On the other hand, a point of view after change is another point of view corresponding to the current position and orientation of the user (e.g., a point of view located higher than a point of view corresponding to the position and orientation of the terminal device 200). In other words, the above change is to change a point of view corresponding to the position and orientation of the terminal device 200 to another point of view corresponding to the current position and orientation of the user.

Also, as in the first embodiment, for example, the request obtaining unit 143 may obtain a request to cancel the above change (hereinafter referred to as a "cancel request").

Note that the above change request may be information which not only triggers a predetermined change in a point of view, but also specifies specific details of the change in a point of view. For example, the change request may be information which specifies one of various types of changes in a point of view described in <<2.3. Specific Example Changes in Point of View>> below. Also, the change request may be information which specifies specific details of a certain type of change in a point of view. For example, when the change is a change in the height of a point of view, the change request may be information which specifies what height the point of view is changed to.

Also, conversely to the above example, a point of view after change may be a point of view which is similar to the user's point of view, and a point of view before change may be another point of view which corresponds to the current position and orientation of the user.

(Image Information Generation Unit 145)

The image information generation unit 145 generates image information under the control of the generation control unit 147. For example, the image information generation unit 145 generates image information of three-dimensional space.

—Image Information of Three-Dimensional Space—

Image information of three-dimensional space is as described in the first embodiment.

—Generation of Reference Image Information—

For example, the image information generation unit 145 generates an image of three-dimensional space based on position information indicating the position of the terminal device 200-2 and orientation information indicating the orientation of the terminal device 200-2, under the control of the generation control unit 147. For example, the image information generation unit 145 generates first image information (that is, reference image information) of three-dimensional space corresponding to the position and orientation of the terminal device 200-2. For example, the reference image information is image information of three-dimensional space which is viewed from a first point of view (hereinafter, referred to as "reference point of view") corresponding to the position and orientation of the terminal device 200-2.

As an example, the reference point of view is a point of view which is located in the air in virtual three-dimensional space which copies real space, facing in the vertical direction. For example, two-dimensional coordinates (plane coordinates) of the above reference point of view correspond to two-dimensional coordinates of the terminal device 200-2. Also, for example, the orientation of the above reference point of view is determined based on the orientation of the terminal device 200-2. Specifically, vertical and horizontal azimuths of the above reference point of view are determined based on the orientation of the terminal device 200-2.

And, when the reference point of view is like the example described above, the image information generation unit 145 generates image information of a two-dimensional map as the reference image information. The image information of a two-dimensional map is, for example, two-dimensional image data of the two-dimensional map created as a two-dimensional image. Also, the image information of a two-dimensional map may be data of a captured image, such as a photograph taken from the air, or data of a two-dimensional image obtained by processing the captured image data using a technique such as morphing, etc. Also, the above image information of a two-dimensional map may be two-dimensional image data of 3DCG which is generated by performing rendering on virtual three-dimensional space, where the above reference point of view is used as a point of view (camera) for rendering.

As another example, the reference point of view is a point of view in the vicinity of a height at which the terminal device 200-2 is assumed to be located. More specifically, for example, the reference point of view is a point of view corresponding to the position and orientation of the terminal device 200. And, the image information generation unit 145 generates image information of three-dimensional space which is viewed from the point of view. In other words, the image information generation unit 145 is an image similar to a scene which the user views.

As in the above examples, various points of view can be set as the reference point of view. Note that the above examples will be described in <<3.3. Specific Example Changes in Point of View>> below.

—Generation of Changed Image Information—

Also, for example, the image information generation unit 145 generates second image information of three-dimensional space (i.e., changed image information) corresponding to the position and orientation of the terminal device 200-2 and a change in a change request. In the second embodiment, the changed image information is, for example, image information of three-dimensional space which is viewed from a second point of view (hereinafter referred to as a "changed point of view") corresponding to the position and orientation of the terminal device 200-2. Also, more specifically, for example, the above reference point of view and the above changed point of view are located at different heights.

As an example, when the reference point of view is a point of view which is located in the air in virtual three-dimensional space which copies real space, facing in the vertical direction, the changed point of view is a point of view located lower than the reference point of view. More specifically, for example, the changed point of view is a point of view located in the vicinity of a height at which the terminal device 200-2 is assumed to be located.

Also, as another example, when the reference point of view is a point of view located in the vicinity of a height at which the terminal device 200-2 is assumed to be located, the changed point of view is a point of view located higher than the reference point of view. For example, the changed point of view is a point of view which is located a predetermined height directly above a point of view corresponding to the position and orientation of the terminal device 200.

As in the above examples, various points of view can be set as the changed point of view. Note that the above examples will be described in <<3.3. Specific Example Changes in Point of View>> below.

As described above, for example, one of the reference point of view and the changed point of view is a point of view located in the vicinity of a height at which the terminal device 200-2 is assumed to be located, the other is a point of view located higher than the reference point of view. In this case, the reference image information corresponds to an image similar to a scene which the user actually views, and the changed image information corresponds to an image of a scene which the user desires to view.

In the foregoing, the generation of the reference image information and the changed image information has been described. Needless to say, the reference point of view and the changed point of view in the above specific example may be interchanged. For example, the changed point of view may be a point of view which is located in the air in virtual three-dimensional space which copies real space, facing in the vertical direction, and the reference point of view may be a point of view located in the vicinity of a height at which the terminal device 200-2 is assumed to be located. Also, for example, the changed point of view may be a point of view which is located a predetermined height directly above a point of view corresponding to the position and orientation of the terminal device 200, and the reference point of view may be a point of view located in the vicinity of a height at which the terminal device 200-2 is assumed to be located.

—Generation of Intermediate Image Information—

Also, for example, the image information generation unit 145 further generates image information of three-dimensional space which is viewed from at least one different point of view which is passed during transition from the reference point of view to the changed point of view (hereinafter referred to as "intermediate image information"). More specifically, for example, the image information generation unit 145 determines at least one point of view which is passed during transition from the reference point of view to the changed point of view. The at least one point of view may be located on a straight line which passes through the reference point of view and the changed point of view, or may not be located on the straight line. And, the image information generation unit 145 generates image information of three-dimensional space which is viewed from the above at least one point of view, i.e., at least one piece of intermediate image information, after the reference image information is generated and before the changed image information is generated.

Note that the image information generation unit 145 may further generate image information of three-dimensional space which is viewed from at least one different point of view which is passed during transition reversely, i.e., from the changed point of view to the reference point of view, as intermediate image information.

(Generation Control Unit 147)

The generation control unit 147 controls generation of image information. For example, the generation control unit 147 controls generation of image information of three-dimensional space which is performed by the image information generation unit 145.

The generation control unit 147 of the second embodiment performs an operation similar to the operation of the generation control unit 137 described in the first embodiment, except for details of image information and details of a change request dealt with.

As described above, one of the reference image information and changed image information corresponds to an image similar to a scene which the user actually views, and the other of the reference image information and changed image information corresponds to an image of a scene which the user desires to view In other words, the user of the terminal device 200-2 is allowed to view both an image similar to a scene which the user views and an image of a scene which the user desires to view, as the user desires, by a request. The user of the terminal device 200-2 is allowed to intuitively recognize a correspondence relationship between a scene which the user views and an image similar to the scene, by viewing the scene which the user views and the image of the scene. Also, the user is allowed to intuitively recognize a correspondence relationship between an image of a scene which the user desires to view and a scene which the user actually views, by viewing an image of a scene which the user views and an image of a scene which the user desires to view while changing these images. As a result, the user is allowed to view an image of a scene which the user desires to view with a feeling close to real space.

In particular, in the second embodiment, the user of the terminal device 200-2 is allowed to view an image of a scene from a point of view (e.g., a point of view located higher than the user's point of view) different from a point of view corresponding to the current position and orientation of the user (i.e., a point of view similar to the user's point of view), as an image of the scene which the user desires to view, as the user desires. In other words, the user is allowed to view an image of a scene from a different point of view (e.g. a point of view located higher than the user's point of view) with a feeling close to real space.

And, in the second embodiment, in addition to an operation similar to the operation of the generation control unit 137 of the first embodiment, the generation control unit 147 further controls generation of image information of three-dimensional space which is viewed from at least one different point of view which is passed during transition from the reference point of view to the changed point of view (i.e., intermediate image information), for example. More specifically, for example, the generation control unit 147 causes the image information generation unit 145 to generate the intermediate image information before a change request is received and changed image information is generated. Note that the generation control unit 147 may cause the image information generation unit 145 to generate the intermediate image information before a cancel request is received and changed image information is generated.

Note that, as described above, the above change request is, for example, information which triggers a change in a predetermined point of view. In this case, for example, the generation control unit 147 notifies the image information generation unit 145 of a change in the point of view, or notifies the image information generation unit 145 of canceling of the change, to control the above generation. Also, the above change request may be information which specifies specific details of a change in the point of view. In this case, for example, the generation control unit 147 may control the above generation by notifying the image information generation unit 145 of specific details of a change in the point of view.

<3.1.2. Configuration of Terminal Device>>

An example configuration of the terminal device 200-2 according to the second embodiment will be described with reference to FIG. 14. FIG. 14 is a block diagram showing the example configuration of the terminal device 200-2 according to the second embodiment. Referring to FIG. 14, the terminal device 200-2 includes a communication unit 210, a storage unit 220, a position detection unit 230, an orientation detection unit 240, a display unit 250, and a processing unit 261.

Here, there is not a difference in the communication unit 210, the storage unit 220, the position detection unit 230, the orientation detection unit 240, and the display unit 250 between the first embodiment and the second embodiment. Therefore, here, a processing unit 261 will be described.

(Processing Unit 261)

The processing unit 261 provides various functions of the terminal device 200-2.

For example, the processing unit 261, when a predetermined user operation has been detected, generates the above change request. As with the processing unit 260 of the first embodiment, various operations performed by the user may be applied as the above predetermined user operation. And, the processing unit 261 causes the communication unit 210 to send the above change request thus generated to the server 100-2.

As described above, for example, the above change request is information which triggers a predetermined change in a point of view. In this case, as an example, the processing unit 261 generates predetermined invariable information as the change request. In this case, specific information forming the change request may be similar to specific information forming the change request in the first embodiment.

Also, the above change request may be information which specifies specific details of a change in a point of view as described above. In this case, as an example, the processing unit 261 may generate variable information including specific details about a change in a point of view. The specific details of a change in a point of view are, for example, the type of the change in the point of view and/or specific change details of a change in a certain type of point of view. For example, the processing unit 261 determines specific details of a change in a point of view based on the result of detection of the user's operation.

Also, for example, the processing unit 261 provides position information indicating the position of the terminal device 200-2 and orientation information indicating the orientation of the terminal device 200-2, to the server 100-2. This point is similar to the processing unit 260 of the first embodiment.

Also, for example, the reference image information is sent from the server 100-2 to the terminal device 200-2 until the above change request is sent to the server 100-2, or until another of the change request is sent after the above cancel request is sent to the server 100-2. This point is also similar to the processing unit 260 of the first embodiment.

Also, for example, the changed image information is sent from the server 100-2 to the terminal device 200-2 until the above cancel request is sent after the above change request is sent. This point is also similar to the processing unit 260 of the first embodiment.

<<3.2. Flow of Process>>

Next, an example information process according to the second embodiment will be described with reference to FIG. 15.

(Process of Server 100-2)

Figure 15:
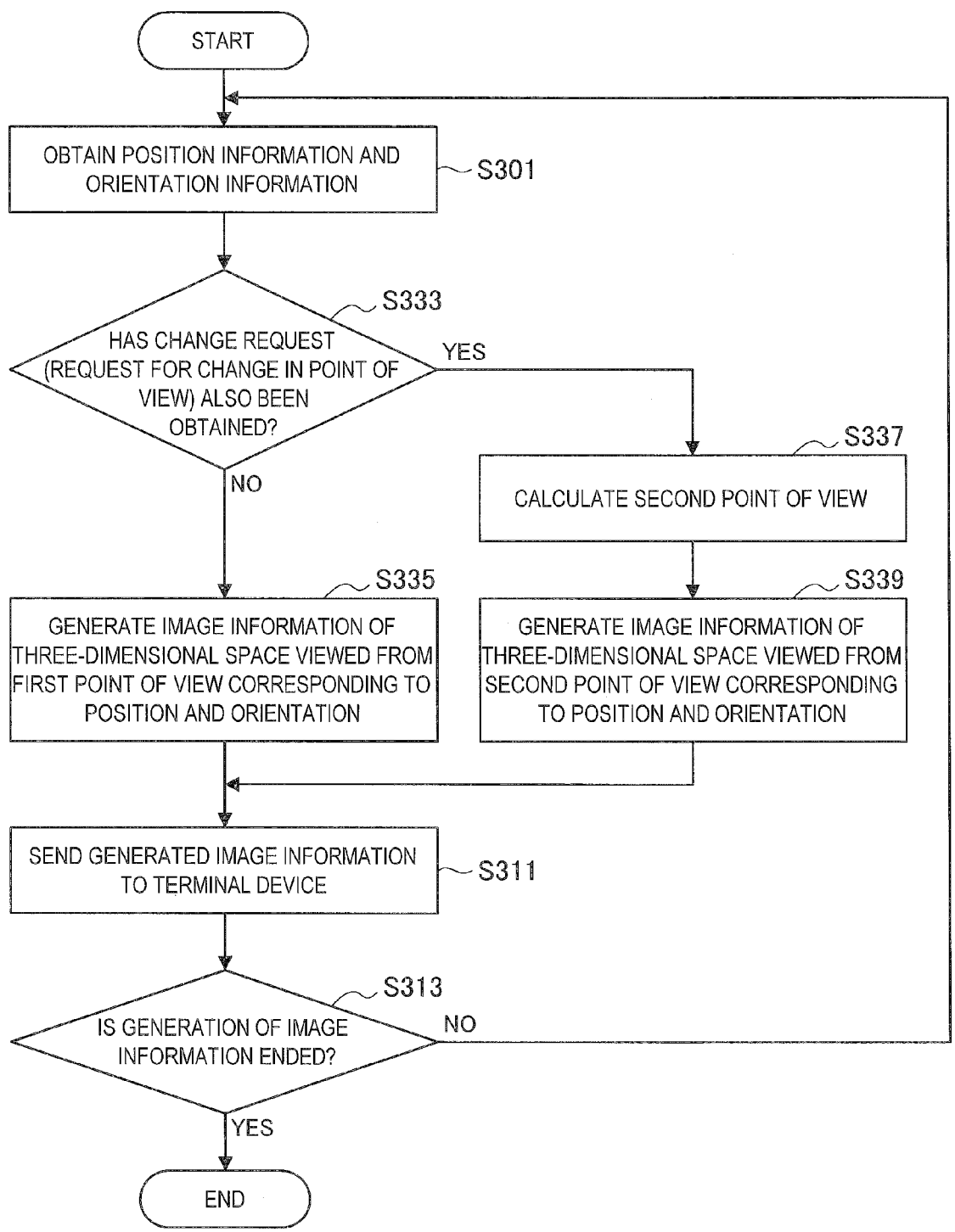
FIG. 15 is a flowchart showing a schematic example flow of an information process of a server according to the second embodiment.

FIG. 15 is a flowchart showing a schematic example flow of the information process of the server 100-2 according to the second embodiment. Here, only a difference between the example information process of the server 100-1 according to the first embodiment and the example information process of the server 100-2 according to the second embodiment, i.e., steps S333, S335, S337, and S339, will be described.

Initially, in step S333, the generation control unit 147 determines whether or not a change request has also been obtained by the request obtaining unit 143. The change request is a request to change a point of view for generating the above image information of three-dimensional space. If the change request has been obtained, the process proceeds to step S337. Otherwise, the process proceeds to step S335.

In step S335, the image information generation unit 145 generates image information of three-dimensional space which is viewed from a first point of view (i.e., a reference point of view) corresponding to the position and orientation of the terminal device 200-2 (i.e., reference image information), under the control of the generation control unit 147.

In step S337, the image information generation unit 145 calculates a second point of view (i.e., a changed point of view) corresponding to the position and orientation of the terminal device 200-2 under the control of the generation control unit 147. Thereafter, in step S339, the image information generation unit 145 generates image information of three-dimensional space which is viewed from the above changed point of view (i.e., changed image information) under the control of the generation control unit 137.

(Process of Terminal Device 200-2)

A schematic flow of the information process of the terminal device 200-2 according to the second embodiment is similar to the schematic flow of the information process of the terminal device 200-1 according to the first embodiment which has been described with reference to FIG. 5.

Note that the change request may not be information which triggers a predetermined change in a point of view, and may be information which specifies specific details of a change in a point of view. In this case, the schematic flow of the information process of the terminal device 200-2 according to the second embodiment may include another step instead of step S409. For example, in this step, the processing unit 261 may generate a change request which specifies specific details of a change in a point of view.

<<3.3. Specific Example Changes in Point of View>>

Next, a first and a second specific example point of view for generating image information of three-dimensional space will be described with reference to FIGS. 16-20.

<3.3.1. Change between Two-Dimensional Map and Three-Dimensional Map>

As a first example, one of the reference image information and the changed image information is image information of a two-dimensional map of three-dimensional space, and the other of the reference image information and the changed image information is image information of a three-dimensional map of three-dimensional space which is viewed from a point of view located in the vicinity of a height at which the terminal device 200-2 is assumed to be located. Specifically, for example, the above change in the point of view is a change between a point of view which is located in the air in virtual three-dimensional space which copies real space, facing in the vertical direction, and a point of view located in the vicinity of a height at which the terminal device 200-2 is assumed to be located. A change in an image in this case will be specifically described with reference to FIGS. 16 and 17.

Figure 16:
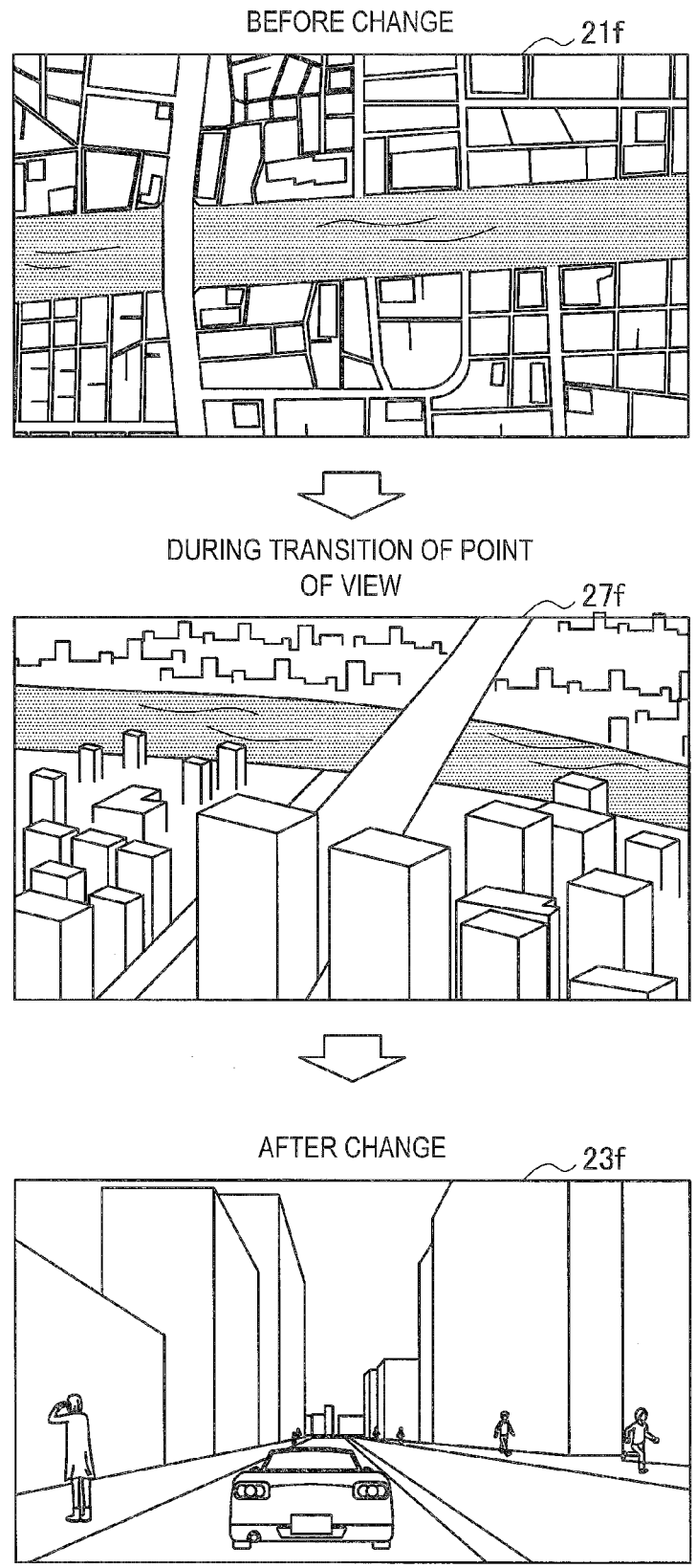
FIG. 16 is a diagram for describing a first example change in an image from a two-dimensional map of three-dimensional space to a three-dimensional map of three-dimensional space.

FIG. 16 is a diagram for describing a first example change in an image from a two-dimensional map of three-dimensional space to a three-dimensional map of three-dimensional space. Referring to FIG. 16, an image (hereinafter referred to a "reference image") 21$f$ of three-dimensional space which is viewed from a point of view before change (i.e., a reference point of view) and an image (hereinafter referred to as a "changed image") 23$f$ of three-dimensional space which is viewed from a point of view after change (i.e., a changed point of view), are shown. Also, an image (hereinafter referred to as an "intermediate image") 27$f$ of three-dimensional space which is viewed from another point of view which is passed during transition from the reference point of view to the changed point of view, is also shown.

In this example, the reference image 21$f$ is a two-dimensional map in the three-dimensional space. That is, the reference point of view is a point of view which is located in the air in virtual three-dimensional space which copies real space, facing in the vertical direction. For example, two-dimensional coordinates (plane coordinates) of the above reference point of view correspond to two-dimensional coordinates of the terminal device 200-2. Also, for example, the orientation of the above reference point of view is determined based on the orientation of the terminal device 200-2. Specifically, vertical and horizontal azimuths of the above reference point of view are determined based on the orientation of the terminal device 200-2.

On the other hand, the changed image 23*f* is a three-dimensional map of three-dimensional space which is viewed from a point of view located at a height at which the terminal device 200-2 is assumed to be located. In other words, the reference point of view is a point of view located at a height at which the terminal device 200-2 is assumed to be located. The changed image 23*f* is, for example, an image similar to a scene which the user views.

Also, the intermediate image 27*f* is a three-dimensional map of three-dimensional space which is viewed from another point of view located closer to the changed point of view than the reference point of view Also, the reference image 21*f* which is a two-dimensional map of three-dimensional space, the changed image 23*f* which is a three-dimensional map of three-dimensional space, and the intermediate image 27*f* are, for example, two-dimensional images of 3DCG. Note that if there is captured image data corresponding to the reference point of view, the changed point of view, or the above different point of view, the reference image 21*f*, the changed image 23*f*, or the intermediate image 27*f* may each be a captured image. For example, the reference image 21*f* may be a captured image such as a photograph taken from the air, and the changed image 23*f* may be a captured image taken on the ground. Also, if a two-dimensional image corresponding to the reference point of view, the changed point of view, or the above different point of view can be generated from captured image data using a technique such as morphing, etc., the reference image 21*f*, the changed image 23*f*, or the intermediate image 27*f* may be a two-dimensional image generated by processing the captured image data.

Thus, a two-dimensional map of three-dimensional space is provided, and therefore, the user of the terminal device 200-2 is allowed to recognize their own position, surroundings of their own position, a destination, etc. Also, the above two-dimensional map is displayed and can be switched to a corresponding three-dimensional map of three-dimensional space, i.e., an image similar to a scene which the user views. Therefore, the user is allowed to intuitively recognize a correspondence relationship between the two-dimensional map and a scene which the user actually views, through a corresponding three-dimensional map of three-dimensional space. As a result, the user is allowed to view a two-dimensional map of three-dimensional space as though the user were located in the air in real space.

Also, an intermediate image is displayed between the two-dimensional map and the three-dimensional map, and therefore, the correspondence relationship between the two-dimensional map and the three-dimensional map can be more intuitively recognized. As a result, the user is allowed to view a two-dimensional map of three-dimensional space as though the user were moving from the ground to the air in real space, or is allowed to view a three-dimensional map of three-dimensional space as though the user were moving from the air to the ground. In other words, the realism is enhanced.

Note that, of course, conversely to the example described with reference to FIG. 16, a changed image may be a two-dimensional map of three-dimensional space, and a reference image may be a three-dimensional map of three-dimensional space.

Figure 17:
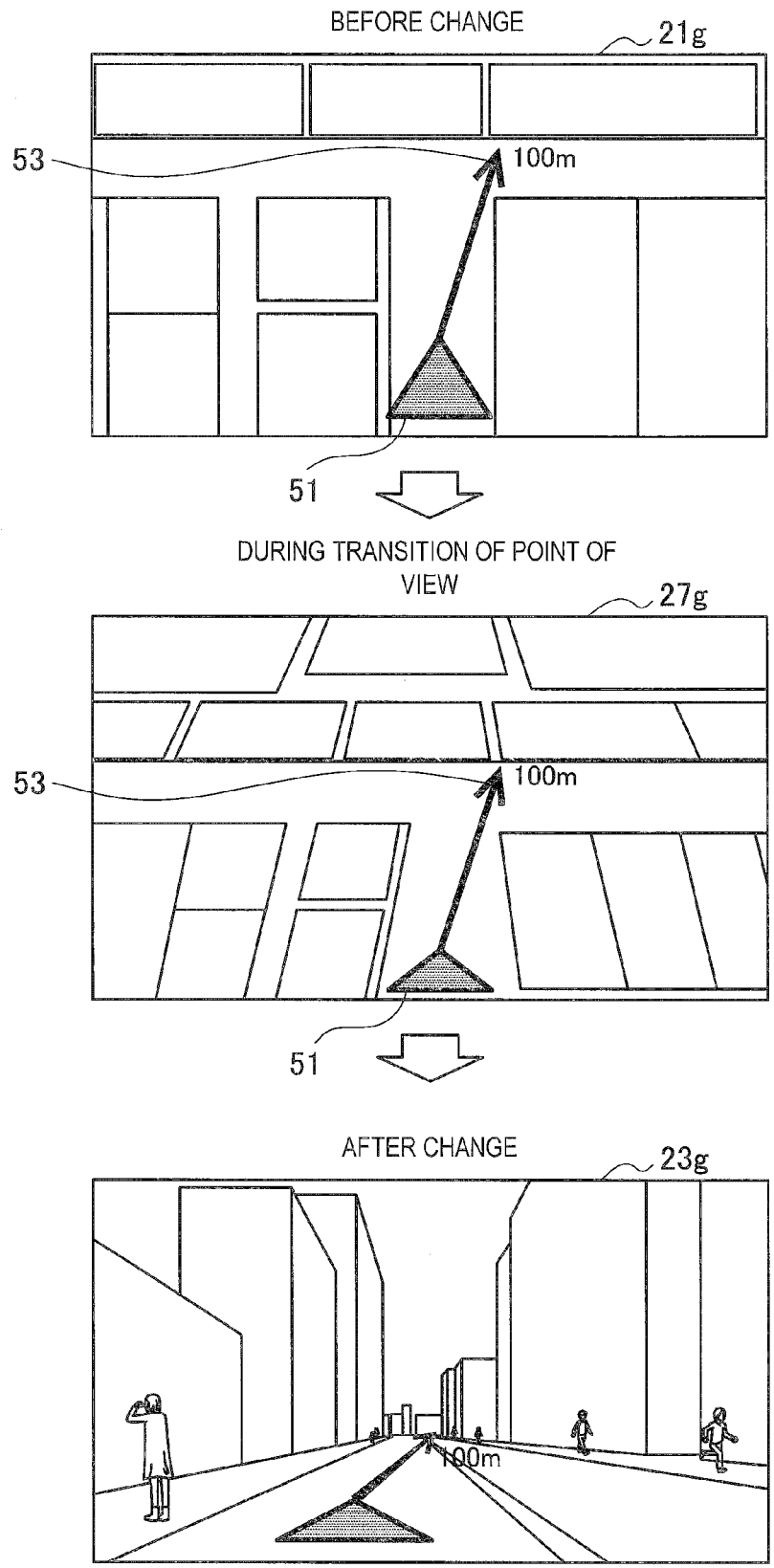
FIG. 17 is a diagram for describing a second example change in an image from a two-dimensional map of three-dimensional space to a three-dimensional map of three-dimensional space.

Next, FIG. 17 is a diagram for describing a second example change in an image from a two-dimensional map of three-dimensional space to a three-dimensional map of three-dimensional space. Referring to FIG. 17, an image (i.e., a reference image) 21*g* of three-dimensional space which is viewed from a point of view before change (i.e., a reference point of view) and an image (i.e., a changed image) 23*g* of three-dimensional space which is viewed from a point of view after change (i.e., a changed point of view), are shown. Also, an image (i.e., an intermediate image) 27*g* of three-dimensional space which is viewed from another point of view which is passed during transition from the reference point of view to the changed point of view, is also shown.

Also, in this example, a reference image 21*g* is a two-dimensional map of three-dimensional space. Specifically, the reference point of view is a point of view located in the air in virtual three-dimensional space which copies real space, facing in the vertical direction. Also, the reference image 21*g* which is a two-dimensional map of three-dimensional space is, for example, a two-dimensional map created as a two-dimensional image.

Also, in this example, a changed image 23*g* is a three-dimensional map of three-dimensional space which is viewed from a point of view located in the vicinity of a height at which the terminal device 200-2 is assumed to be located. In other words, the reference point of view is a point of view located in the vicinity of a height at which the terminal device 200-2 is assumed to be located. The changed image 23*g* is, for example, an image similar to a scene which the user views. Also, the changed image 23*f* which is a three-dimensional map of three-dimensional space is, for example, a two-dimensional image of 3DCG. Note that when there is data of a captured image corresponding to the reference point of view, the reference image 21*f* may be a captured image taken on the ground. Also, if the two-dimensional image corresponding to the reference point of view can be generated from the captured image data using a technique such as morphing, etc., the reference image 21*f* may be a two-dimensional image generated by processing the captured image data.

Also, an intermediate image 27*g* is a processed two-dimensional map of three-dimensional space which is viewed from another point of view which is located closer to the changed point of view than the reference point of view. The processed two-dimensional map is generated by processing a normal two-dimensional map which is a reference image.

Also, in the reference image 21*g*, the changed image 23*g*, and the intermediate image 27*g*, an arrow 51 indicating the orientation of the terminal device 200-2 (i.e., the orientation of the user), and an arrow 53 indicating a direction from the position of the terminal device 200-2 (i.e., the position of the user) to a destination, are shown.

As in the example described with reference to FIG. 16, a similar advantage is obtained in the example of FIG. 17. Specifically, a two-dimensional map of three-dimensional space is provided, and therefore, the user of the terminal device 200-2 is allowed to recognize their own position, surroundings of their own position, a destination, etc. Also, the above two-dimensional map is displayed and can be switched to a corresponding three-dimensional map of three-dimensional space, i.e., an image similar to a scene which the user views. Therefore, the user is allowed to intuitively recognize a correspondence relationship between a two-dimensional map and a scene which the user views, through a corresponding three-dimensional map of three-dimensional space. As a result, the user is allowed to view a two-dimensional map of three-dimensional space as though the user were in the air in real space.

Also, an intermediate image (processed two-dimensional map) is displayed between the two-dimensional map and the three-dimensional map, and therefore, the correspondence relationship between the two-dimensional map and the three-dimensional map can also be more intuitively recognized. As a result, the user is allowed to view a two-dimensional map of three-dimensional space as though the user were moving from the ground to the air in real space, or is allowed to view a three-dimensional map of three-dimensional space as though the user were moving from the air to the ground. In other words, the realism is enhanced.

Also, the arrow 51 indicating the orientation of the user, and the arrow 53 indicating a direction from the position of the user to a destination, are shown. Therefore, the user is allowed to intuitively recognize what direction in a three-dimensional map a direction shown in a two-dimensional map corresponds to, i.e., what direction in a scene which the user views a direction shown in a two-dimensional map corresponds to.

Note that, of course, conversely to the example described with reference to FIG. 17, a changed image may be a two-dimensional map of three-dimensional space, and a reference image may be a three-dimensional map of three-dimensional space.

<3.3.2. Change between Point of View Similar to User's One and Higher Point of View>

As a second example, one of the reference point of view and the changed point of view is a point of view located in the vicinity of a height at which the terminal device 200-2 is assumed to be located, and the other of the reference point of view and the changed point of view is a point of view located higher than the above point of view located in the vicinity of a height at which the terminal device 200-2 is assumed to be located. A change in an image in this case will be specifically described with reference to FIGS. 18-20.

Figure 18:
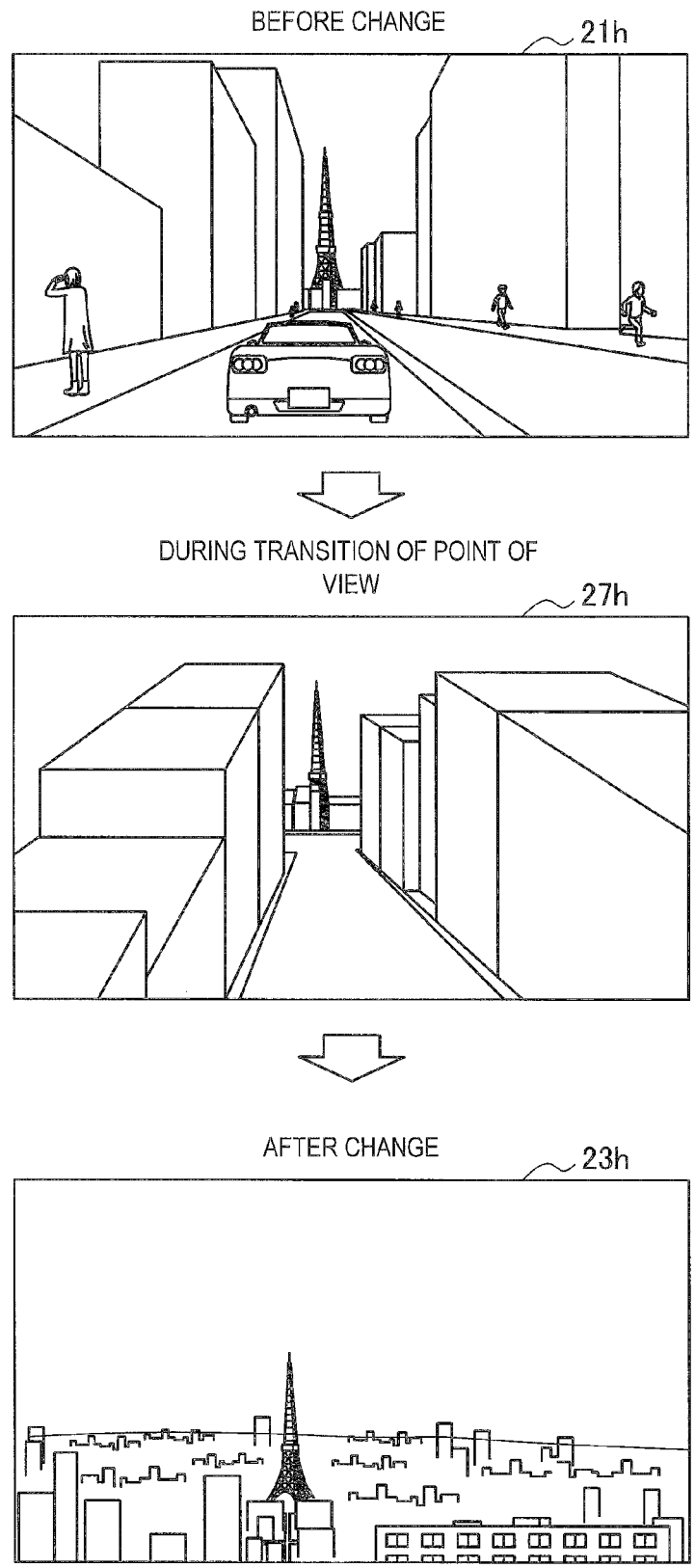
FIG. 18 is a diagram for describing an example change in an image when a point of view is changed to a point of view which is located higher than a point of view located in the vicinity of a height at which a terminal device is assumed to be located.

FIG. 18 is a diagram for describing an example change in an image when a point of view is changed to a point of view which is located higher than a point of view located in the vicinity of a height at which the terminal device 200-2 is assumed to be located. Referring to FIG. 18, an image (i.e., a reference image) 21h of three-dimensional space which is viewed from a point of view before change (i.e., a reference point of view) and an image (i.e., a changed image) 23h of three-dimensional space which is viewed from a point of view after change (i.e., a changed point of view), are shown. Also, an image (i.e., an intermediate image) 27h of three-dimensional space which is viewed from another point of view which is passed during transition from the reference point of view to the changed point of view, is shown.

In this example, the reference image 21h is an image of three-dimensional space which is viewed from a point of view located in the vicinity of a height at which the terminal device 200-2 is assumed to be located. The reference image 21h is, for example, an image similar to a scene which the user views.

Also, the changed image 23h is a three-dimensional map of three-dimensional space which is viewed from a point of view located higher than the reference point of view. For example, the reference point of view is a point of view located higher than a height at which the terminal device 200-2 is assumed to be located, by a predetermined height (e.g., 50 meters).

Also, the intermediate image 27h is an image of three-dimensional space which is viewed from a point of view located at a height between the reference point of view and the changed point of view.

Also, the reference image 21h, the changed image 23h, and the intermediate image 27h are, for example, two-dimensional images of 3DCG. Note that if there is data of a captured image corresponding to the reference point of view, the changed point of view, or the above different point of view, the reference image 21h, the changed image 23h, or the intermediate image 27h may each be a captured image. For example, the reference image 21h may be a captured image taken on the ground, and the changed image 23h may be a captured image such as a photograph taken from the air. Also, if a two-dimensional image corresponding to the reference point of view, the changed point of view, or the above different point of view can be generated from data of a captured image using a technique such as morphing, etc., the reference image 21h, the changed image 23h, or the intermediate image 27h may be a two-dimensional image which is generated by processing the captured image data.

Thus, an image of a scene which is viewed from a point of view located higher than a point of view of the user of the terminal device 200-2, is provided, and therefore, the user is allowed to view a scene as though the user were flying in the air over the current position in the image. As a result, the user is allowed to recognize a situation in the far distance. Also, an image of a scene which is viewed at a higher point of view is displayed and can be switched to an image similar to a scene which the user views. Therefore, the user is allowed to intuitively recognize a correspondence relationship between an image of a scene which is viewed from a higher point of view and a scene which the user actually views, through an image similar to a scene which the user views. As a result, the user is allowed to view an image similar to a scene which is viewed from a higher point of view as though the user were flying in the air over the current position in real space.

Also, an intermediate image is also displayed between the reference image and the changed image, a correspondence relationship between an image similar to a scene which the user views and an image of a scene which is viewed from a higher point of view can be more intuitively recognized. As a result, the user is allowed to view an image of a scene which is viewed form a higher point of view, as though the user were flying gradually higher from the ground to the air in real space. In other words, the realism is enhanced.

Note that the generation control unit 147 may further control generation of image information of three-dimensional space which is viewed from at least one different point of view to which the changed point of view is further transitioned. This point will now be specifically described with reference to FIGS. 19 and 20.

FIG. 19 is a diagram for describing an example image of three-dimensional space which is viewed from at least one different point of view to which the changed point of view is further transitioned. Referring to FIG. 19, the changed image 23h described in FIG. 18, and an image (hereinafter referred to as an additional transition image) 29 of three-dimensional space which is viewed from a point of view to which the changed point of view is further transitioned, are shown. For example, as shown in FIG. 19, a point of view is transitioned further forward from the changed point of view, and image information of three-dimensional space which is viewed from the point of view after the transition is generated. Thereafter, the image 29 is displayed using the image information. The transition of a point of view may be determined based on the user's operation, or may be automatically determined.

For example, such a transition allows the user of the terminal device 200-2 to view an image of a desired scene by moving a point of view as the user desires. Also, for example, the user of the terminal device 200-2 is allowed to experience a simulated flight. The simulated flight experience allows for a virtual low-altitude flight experience which is normally not experienced.

FIG. 20 is a diagram for describing an example mode of transition of a point of view from the changed point of view. Referring to FIG. 20, a circumvention flight mode which is a mode of movement of a point of view, and an entry flight mode which is a mode of a point of view, are shown. In the circumvention flight mode, a point of view 60 transitions while circumventing an existing object 31 corresponding to a building. On the other hand, in the entry flight mode, the point of view 60 transitions while entering the existing object 31 corresponding to a building. When such an entry mode is used, the interior decoration of the existing object 31 is also modeled, for example As a result, in the entry flight mode, the user is allowed to view even the interior of a building.

<<<4. Hardware Configurations>>>

Figure 21:
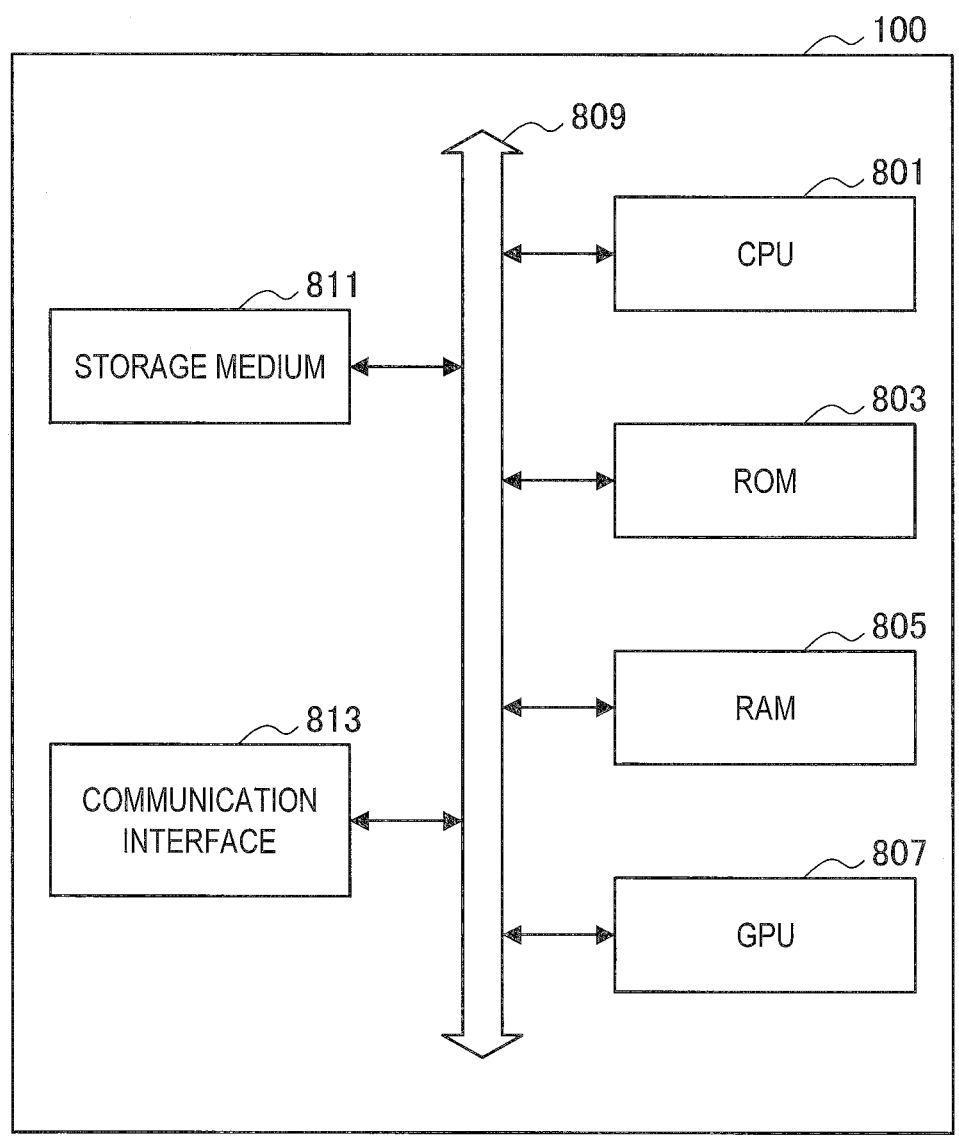
FIG. 21 is a block diagram showing an example hardware configuration of a server according to an embodiment of the present disclosure.
Figure 22:
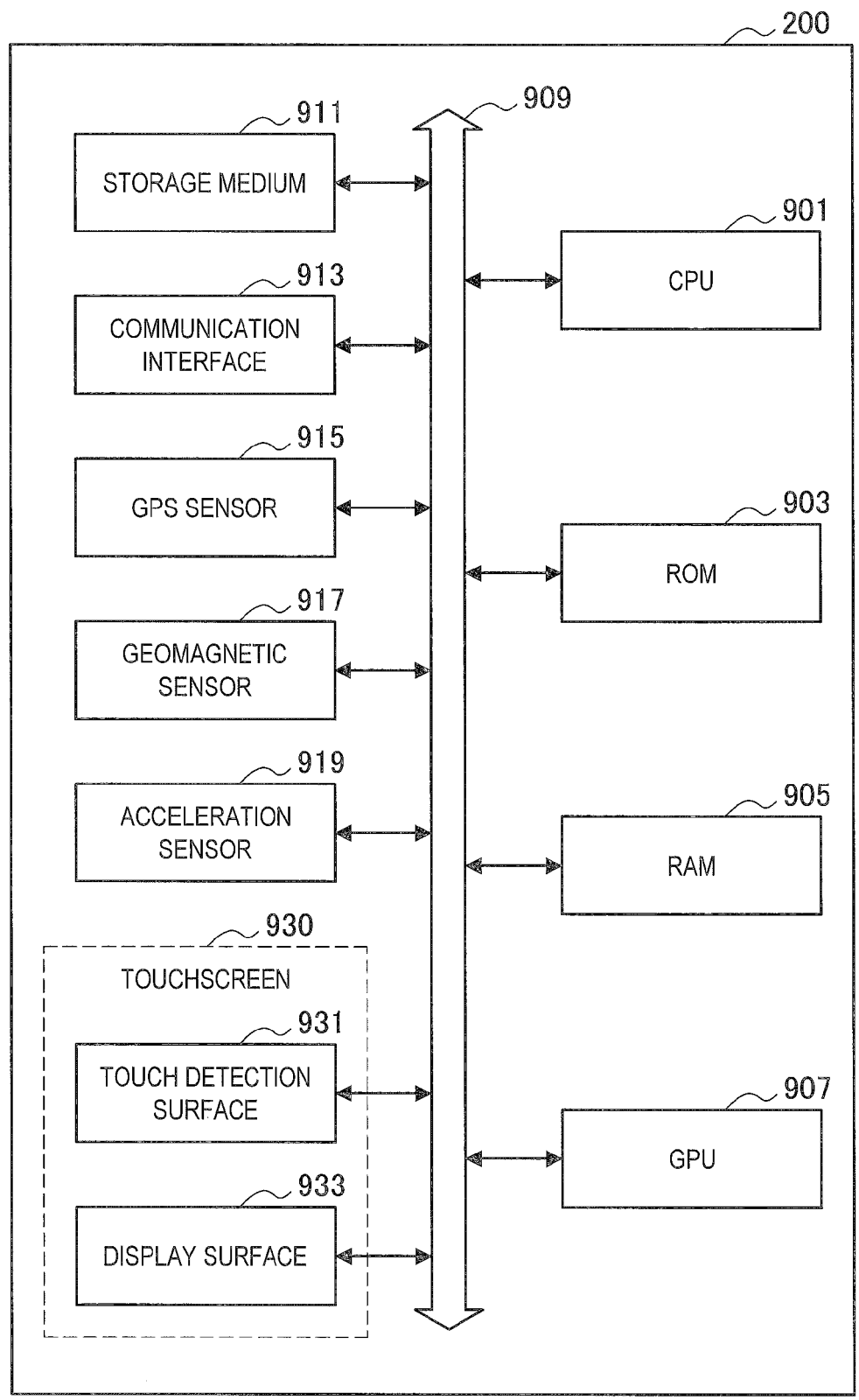
FIG. 22 is a block diagram showing an example hardware configuration of a terminal device according to an embodiment of the present disclosure.

Next, example hardware configurations of the server 100 and the terminal device 200 according to the embodiments of the present disclosure will be described with reference to FIGS. 21 and 22.

<<4.1. Hardware Configuration of Server>>

An example hardware configuration of the server 100 according to the embodiments of the present disclosure will be described with reference to FIG. 21. FIG. 21 is a block diagram showing the example hardware configuration of the server 100 according to the embodiments of the present disclosure. Referring to FIG. 21, the server 100 includes a CPU (Central Processing Unit) 801, a ROM (Read Only Memory) 803, a RAM (Random Access Memory) 805, a GPU (Graphics Processing Unit) 807, a bus 809, a storage medium 811, and a communication interface 813.

The CPU 801, which functions as a calculation processing device and a control device, controls all or a portion of operations in the server 100 in accordance with various programs stored in the ROM 803, the RAM 805, or the storage medium 811. The ROM 803 stores programs, calculation parameters, etc., that are used by the CPU 801. The RAM 1805 temporarily stores a program used by the CPU 801, or a parameter varying during execution of a program as required, etc. The GPU 807 performs various processes related to generation of image information. The bus 809 connects the CPU 801, the ROM 803, the RAM 805, and the GPU 807 together. Also, the storage medium 811 and the communication interface 813 are connected to the bus 809.

The storage medium 811 stores, for example, various items of data, such as basic software such as an OS (Operating System), etc., applications, etc. Here, examples of the recording medium 811 include magnetic recording media such as a hard disk, etc., nonvolatile memories such as an EEPROM (Electrically Erasable and Programmable Read Only Memory), flash memory MRAM (Magnetoresistive Random Access Memory), FeRAM (Ferroelectric Random Access Memory), PRAM (Phase change Random Access Memory), etc., but are not limited to these.

The communication interface 813, which is a communication means included in the server 100, functions as a communication unit for communicating with an external device through a network (or directly), through a wireless or wired connection. Here, examples of the communication interface 813 include a communication antenna and an RF circuit (wireless communication), an IEEE 802.15.1 port and a transmission/reception circuit (wireless communication), an IEEE 802.11b port and a transmission/reception circuit (wireless communication), or a LAN terminal and a transmission/reception circuit (wired communication), etc., but are not limited to these.

Note that the communication unit 110 of the server 100 may be implemented by the communication interface 813. Also, the storage unit 120 may be implemented by the storage medium 811. Also, the processing units 130 and 140 may be implemented by, for example, the CPU 801, the ROM 803, the RAM 805, and the GPU 807.

<<4.2. Hardware Configuration of Terminal Device>>

An example hardware configuration of the terminal device 200 according to the embodiments of the present disclosure will be described with reference to FIG. 22. FIG. 22 is a block diagram showing the example hardware configuration of the terminal device 200 according to the embodiments of the present disclosure. Referring to FIG. 22, the terminal device 200 includes a CPU 901, a ROM 903, a RAM 905, a GPU 907, a bus 909, a storage medium 911, a communication interface 913, a GPS sensor 915, a geomagnetic sensor 917, an acceleration sensor 919, and a touchscreen 930.

The CPU 901, ROM 903, RAM 905, GPU 907, storage medium 911, and communication interface 913 of the terminal device 200 are similar to the CPU 801, ROM 803, RAM 805, GPU 807, storage medium 811, and communication interface 813 of the server 100. Therefore, here, the GPS sensor 915, the geomagnetic sensor 917, the acceleration sensor 919, and the touchscreen 930 will be described.

The GPS sensor 915 detects position information indicating the position of the terminal device 200. The position information includes, for example, three-dimensional coordinate information in real space. Also, the geomagnetic sensor 917 detects an azimuth of the terminal device 200. Also, the acceleration sensor 919 detects an acceleration of the terminal device 200. The acceleration sensor 919 is, for example, a triaxial acceleration sensor which detects accelerations along two horizontal axes and one vertical axis. The acceleration sensor 919 can also detect the gravitational acceleration. In other words, the acceleration sensor 919 outputs information for specifying the tilt in the vertical direction of the terminal device 200.

The touchscreen 930 includes a touch detection surface 931 and a display surface 933.

The touch detection surface 931 detects a touch location on the touchscreen 930. More specifically, for example, when the user touches the touchscreen 930, the touch detection surface 931 senses the touch, generates an electrical signal corresponding to the location of the touch, and converts the electrical signal into information of the touch location. The touch detection surface 931 may, for example, be formed in accordance with any touch detection scheme, such as capacitive, resistive, optical, etc.

The display surface 933 displays an output image from the terminal device 200. The display surface 933 may, for example, be implemented using a liquid crystal, organic EL (Organic Light-Emitting Diode: OLED), CRT (Cathode Ray Tube), etc.

Note that the communication unit 210 of the terminal device 200 may, for example, be implemented by the communication interface 913. Also, the storage unit 220 may, for example, be implemented by the storage medium 911. Also, the position detection unit 230 may, for example, be implemented by the GPS sensor 915. Also, the orientation detection unit 240 may, for example, be implemented by the geomagnetic sensor 917, the acceleration sensor 919, and the CPU 901, the ROM 903, and the RAM 905. Also, the display unit 250 may, for example, be implemented by the display surface 933 of the touchscreen 930. Also, the processing unit 260, e.g., 261 may, for example, be implemented by the CPU 901, the ROM 903, the RAM 905, and the GPU 907.

<<7. Summary>>

In the foregoing, the devices and information processes according to the embodiments of the present disclosure have been described using FIGS. 1-22. According to the embodiments of the present disclosure, generation of image information of three-dimensional space based on position information indicating the position of the terminal device 200 and orientation information indicating the orientation of the terminal device 200, is controlled. Also, a request for a change (i.e., a change request) related to the above generation of image information is obtained. And, the above generation is controlled so that first image information of three-dimensional space (i.e., reference image information) corresponding to the position and orientation of the terminal device 200 is generated. Also, when the change request is obtained, the above generation is controlled so that second image information of three-dimensional space (i.e., changed image information) corresponding to the position of the terminal device 200, the orientation of the terminal device 200, and the above change, is generated.

One of the reference image information and changed image information corresponds to an image similar to a scene which the user actually views, and the other of the reference image information and changed image information corresponds to an image of a scene which the user desires to view. In other words, the user of the terminal device 200-2 is allowed to view both an image similar to a scene which the user views and an image of a scene which the user desires to view, as the user desires, by a request. The user of the terminal device 200-2 is allowed to intuitively recognize a correspondence relationship between a scene which the user views and an image similar to the scene, by viewing the scene which the user views and the image of the scene. Also, the user is allowed to intuitively recognize a correspondence relationship between an image of a scene which the user desires to view and a scene which the user actually views, by viewing an image of a scene which the user views and an image of a scene which the user desires to view while changing these images. As a result, the user is allowed to view an image of a scene which the user desires to view with a feeling close to real space.

Also, according to the first embodiment, first image information of three-dimensional space corresponding to the position and orientation of the terminal 100 is generated. Also, second image information of three-dimensional space which has been partially or entirely changed, that corresponds to the position and orientation of the terminal 100, is also generated in response to the request.

As a result, the user of the terminal device 200 is allowed to view an image of three-dimensional space which is partially or entirely different from real space, i.e., edited three-dimensional space, as an image of a scene which the user desires to view, as the user desires. Also, the user of the terminal device 200 is allowed to view an image of three-dimensional space similar to real space, i.e., non-edited three-dimensional space, as an image similar to a scene which the user actually views. Therefore, the user of the terminal device 200 is allowed to intuitively recognize a correspondence relationship between an image of the edited three-dimensional space and a scene which the user actually views, through an image of the non-edited three-dimensional space. As a result, the user is allowed to view an image of the edited three-dimensional space with a feeling close to real space.

Also, in the first embodiment, according to the first specific example of a change in three-dimensional space, the change in three-dimensional space is to delete an object satisfying a condition, of objects included in all or a portion of three-dimensional space, or the change in three-dimensional space is to add an object satisfying a condition to all or a portion of three-dimensional space in which that object satisfying a condition has not been placed.

For example, the object satisfying the condition is an object other than a target object. Accordingly, the user of the terminal device 200-1 is allowed to recognize the target object (e.g., a destination) and the surrounding environment. Also, the user is allowed to intuitively recognize a correspondence relationship between the changed image 23a and a scene which the user views, through the reference image 21a which is an image similar to the scene which the user views. As a result, the user is allowed to view a target object (e.g., a destination) and the surrounding environment in the changed image 23a with a feeling close to real space.

In addition, for example, the object satisfying the condition is an object which exceeds a predetermined height. Accordingly, the user of the terminal device 200-1 is allowed to recognize a scenery in the far distance. Also, the user is allowed to intuitively recognize a correspondence relationship between the changed image 23b and a scene which the user views, through the reference image 21b which is an image similar to the scene which the user views. As a result, the user is allowed to view a scenery in the far distance in the changed image 23b with a feeling close to real space.

Also, in the first embodiment, according to the third specific example of a change in three-dimensional space, the change in three-dimensional space is to replace an object included in a portion of three-dimensional space with another object.

Therefore, the user of the terminal device 200-1 is allowed to recognize how a scene will be changed if an envisaged change is made in real space. Also, the user is allowed to intuitively recognize a correspondence relationship between the changed image 23c and a scene which the user views, through the reference image 21c which is an image of the scene which the user views. As a result, the user is allowed to view a scene in which an envisaged change will have been made in the changed image 23c with a feeling close to real space.

Also, in the first embodiment, according to the fourth specific example of a change in three-dimensional space, the change in three-dimensional space is to change the three-dimensional space from three-dimensional space corresponding to first time to three-dimensional space corresponding to second time.

Accordingly, for example, the user of the terminal device 200-1 is allowed to recognize what the three-dimensional space was like in the past or what the three-dimensional space will be like in the future. Also, the user is allowed to intuitively recognize a correspondence relationship between the changed image 23a and a scene which the user views, through the reference image 21a which is an image similar to the scene which the user views. As a result, the user is allowed to view a past or future scene in the changed image 23a with a feeling close to real space.

In addition, according to the fifth specific example of a change in three-dimensional space in the first embodiment, a change in three-dimensional space is to maintain a first region (i.e., a maintained region) including a position corresponding to the position of a terminal device 100, of the three-dimensional space, and simplify a second region (i.e., a simplified region) other than the above partial region, of the above three-dimensional space. And, the reference image information is map information of three-dimensional space corresponding to the position and orientation of the terminal device 100, and the changed image information is map information of three-dimensional space after change corresponding to the position and orientation of the terminal device 100. Also, the above maintained region is, for example, determined based on the history of accumulated positions of the terminal device 200-1.

Accordingly, the map information of three-dimensional space which copies real space, that is thus generated, can, for example, be used in a game. For example, the map information can be used as map information for a game which uses, as a stage, three-dimensional space which copies real space. Also, the above map information is data of three-dimensional space, which is used as data of three-dimensional space for a game (a stage for a game). Specifically, map information and/or a stage for a game can be provided which allows the user to view details of a region which is familiar to the user, and does not allow the user to view details of a region which is not familiar to the user. As a result, a game can be provided which provides realistic experiences based on the user's experiences.

Also, according to the second embodiment, first image information of three-dimensional space which is viewed from a first point of view (i.e., a reference point of view) corresponding to the position and orientation of the terminal 100, is generated. Also, second image information of three-dimensional space which is viewed from a second point of view (i.e., a changed point of view) corresponding to the position and orientation of the terminal 100, is generated.

As a result, the user of the terminal device 200 is allowed to view an image of a scene from a different point of view corresponding to the current position and orientation of the user, as an image of a scene which the user desires to view, as the user desires, in addition to an image similar to a scene which the user views. Also, the user of the terminal device 200 is also allowed to view an image similar to a scene which the user actually views. Therefore, the user of the terminal device 200 is allowed to intuitively recognize a correspondence relationship between an image of a scene from a different point of view and a scene which the user actually views, through an image similar to the scene which the user actually views. As a result, the user is allowed to view an image of a scene from a different point of view with a feeling close to real space.

Also, in the second embodiment, according to the first specific example of a change in a point of view, one of the reference image information and the changed image information is image information of a two-dimensional map of three-dimensional space, and the other of the reference image information and the changed image information is image information of a three-dimensional map of three-dimensional space which is viewed from a point of view located in the vicinity of a height at which the terminal device 200-2 is assumed to be located.

Thus, a two-dimensional map of three-dimensional space is provided, and therefore, the user of the terminal device 200-2 is allowed to recognize their own position, surroundings of their own position, a destination, etc. Also, the above two-dimensional map is displayed and can be switched to a corresponding three-dimensional map of three-dimensional space, i.e., an image similar to a scene which the user views. Therefore, the user is allowed to intuitively recognize a correspondence relationship between the two-dimensional map and a scene which the user actually views, through a corresponding three-dimensional map of three-dimensional space. As a result, the user is allowed to view a two-dimensional map of three-dimensional space as though the user were located in the air in real space.

Also, in the second embodiment, according to the second specific example of a change in a point of view, one of the reference point of view and the changed point of view is a point of view located in the vicinity of a height at which the terminal device 200-2 is assumed to be located, and the other of the reference point of view and the changed point of view is a point of view located higher than the above point of view located in the vicinity of a height at which the terminal device 200-2 is assumed to be located.

Accordingly, the user is allowed to view a scene as though the user were flying in the air over the current position in the image. As a result, the user is allowed to recognize a situation in the far distance. Also, an image of a scene which is viewed at a higher point of view is displayed and can be switched to an image similar to a scene which the user views. Therefore, the user is allowed to intuitively recognize a correspondence relationship between an image of a scene which is viewed from a higher point of view and a scene which the user actually views, through an image similar to a scene which the user views. As a result, the user is allowed to view an image similar to a scene which is viewed from a higher point of view as though the user were flying in the air over the current position in real space.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, the configuration of the information processing system is not limited to the above examples. For example, the function of the server may be implemented in the terminal device. In other words, the information processing system may not include the server, and may include only the terminal device.

Also, for example, the server is not limited to the above examples. For example, the server includes the request obtaining unit and the generation control unit, while components, such as the information obtaining unit, the image information generation unit, etc., may be included in another device (e.g., a terminal device, another server, etc.).

Also, for example, the terminal device is not limited to a smartphone. The terminal device may, for example, be another device which is used by the user, such as a mobile telephone terminal other than smartphones, PC (Personal Computer), mobile information terminal (Personal Digital Assistant), automotive navigation system, digital camera, game device, etc. Also, the terminal may be a captured image display device or head-mounted display disclosed in JP 2008-67218A.

Also, for example, the position detection unit, orientation detection unit, and display unit of the terminal device may not be included in the terminal device, and may be externally connected devices.

Also, the process steps in the information process of the present specification may not necessarily be executed in a time-series manner in the order described in the flowchart. For example, the process steps in the information process may be executed in an order different from the order described as the flowchart, or may be executed in parallel.

Also, a computer program for causing hardware such as a CPU, ROM, and RAM, etc., included in the server and the terminal device, to perform the same function as that of each configuration of the above server and the above terminal device, can be created. Also, a storage medium storing the computer program is also provided.

Additionally, the present technology may also be configured as below.

(1)

An information processing device including:

a control unit that controls generation of image information of three-dimensional space based on position information indicating a position of a terminal device and orientation information indicating an orientation of the terminal device; and an obtaining unit that obtains a request for a change related to the generation of the image information, wherein the control unit controls the generation in a manner that first image information of the three-dimensional space corresponding to the position and the orientation is generated, and when obtaining the request, the control unit controls the generation in a manner that second image information of the three-dimensional space corresponding to the position, the orientation, and the change is generated.

(2)

The information processing device according to (1), wherein the change is a change in all or a portion of the three-dimensional space, and the second image information is image information of the three-dimensional space after the change corresponding to the position and the orientation.

(3)

The information processing device according to (2), wherein the first image information is image information of the three-dimensional space which is viewed from a point of view corresponding to the position and the orientation, and the second image information is image information of the three-dimensional space after the change which is viewed from the point of view.

(4)

The information processing device according to (3), wherein the change is to add, delete, or change an object included in the three-dimensional space.

(5)

The information processing device according to (4), wherein the change includes deleting an object satisfying a condition among objects included in all or a portion of the three-dimensional space, or adding the object satisfying the condition to all or a portion of the three-dimensional space in which the object satisfying the condition has not been placed.

(6)

The information processing device according to (5), wherein the object satisfying the condition is an object other than a target object.

(7)

The information processing device according to (5), wherein the object satisfying the condition is an object which exceeds a predetermined height.

(8)

The information processing device according to any one of (4) to (7), wherein the change includes replacing an object included in a portion of the three-dimensional space with another object.

(9)

The information processing device according to (8), wherein the control unit further controls generation of image information of the three-dimensional space after the change which is viewed from a point of view located in or in the vicinity of the replaced another object. (10)

The information processing device according to any one of (4) to (9), wherein the change includes changing a portion of an individual object included in the three-dimensional space.

(11)

The information processing device according to any one of (4) to (10), wherein the object includes an object corresponding to a building.

(12)

The information processing device according to any one of (3) to (11), wherein the change includes a change in the three-dimensional space from the three-dimensional space corresponding to first time to the three-dimensional space corresponding to second time.

(13)

The information processing device according to (2), wherein the first image information is map information of the three-dimensional space corresponding to the position and the orientation, the change is to maintain a first region including a position corresponding to the position in the three-dimensional space, and simplify a second region other than the partial region in the three-dimensional space, and the second image information is map information of the three-dimensional space after the change corresponding to the position and the orientation.

(14)

The information processing device according to (13), wherein the first region is determined based on a history of accumulated positions of the terminal device.

(15)

The information processing device according to (1), wherein the change is to change a point of view for generating the image information of the three-dimensional space, the first image information is image information of the three-dimensional space which is viewed from a first point of view corresponding to the position and the orientation, and the second image information is image information of the three-dimensional space which is viewed from a second point of view corresponding to the position and the orientation.

(16)

The information processing device according to (15), wherein the first point of view and the second line of sight are located at different heights.

(17)

The information processing device according to (16), wherein one of the first image information and the second image information is image information of a two-dimensional map of the three-dimensional space, and the other of the first image information and the second image information is image information of a three-dimensional map of the three-dimensional space which is viewed from a point of view located in the vicinity of a height at which the terminal device is assumed to be located.

(18)

The information processing device according to (16), wherein one of the first point of view and the second point of view is a point of view located in the vicinity of a height at which the terminal device is assumed to be located, and the other of the first point of view and the second point of view is a point of view located higher than the point of view located in the vicinity of the height at which the terminal device is assumed to be located.

(19)

The information processing device according to any one of (15) to (18), wherein the control unit further controls generation of image information of the three-dimensional space which is viewed from at least one different point of view which is passed during transition from the first point of view to the second point of view.

(20)

A program causing a computer to function as:

a control unit that controls generation of image information of three-dimensional space based on position information indicating a position of a terminal device and orientation information indicating an orientation of the terminal device; and an obtaining unit that obtains a request for a change related to the generation of the image information, wherein the control unit controls the generation in a manner that first image information of the three-dimensional space corresponding to the position and the orientation is generated, and when obtaining the request, the control unit controls the generation in a manner that second image information of the three-dimensional space corresponding to the position, the orientation, and the change is generated.

REFERENCE SIGNS LIST 10 network
21 reference image
23 changed image
31 existing object
33 new object
35 changed object
41 maintained region
43 simplified region
100 server
110 communication unit
120 storage unit
130, 140 processing unit
131 information obtaining unit
133, 143 request obtaining unit
135, 145 image information generation unit
137, 147 generation control unit
200 terminal device
210 communication unit
220 storage unit
230 position detection unit
240 orientation detection unit
250 display unit
260, 261 processing unit

The invention claimed is:

1. An information processing device, comprising:
circuitry configured to:
control generation of image information of three-dimensional space based on position information indicating a position of a terminal device and orientation information indicating an orientation of the terminal device; and
obtain a request for a change related to the generation of the image information,
wherein the circuitry is configured to control the generation in a manner that first image information of the three-dimensional space corresponding to the position and the orientation is generated, and in an event the request is obtained, the circuitry is configured to control the generation in a manner that second image information of the three-dimensional space corresponding to the position, the orientation, and the change is generated,
wherein the change is a change in all or a portion of the three-dimensional space, and
wherein the first image information is image information of the three-dimensional space which is viewed from a point of view corresponding to the position and the orientation, and the second image information is image information of the three-dimensional space after the change which is viewed from the point of view.

2. The information processing device according to claim 1, wherein the change is to add, delete, or change an object included in the three-dimensional space.

3. The information processing device according to claim 2, wherein the change is to delete an object that satisfies a condition among objects included in all or a portion of the three-dimensional space, or to add the object that satisfies the condition to all or a portion of the three-dimensional space in which the object satisfying the condition has not been placed.

4. The information processing device according to claim 3, wherein the object that satisfies the condition is an object other than a target object.

5. The information processing device according to claim 3, wherein the object that satisfies the condition is an object which exceeds a predetermined height.

6. The information processing device according to claim 2, wherein the change is to replace an object included in a portion of the three-dimensional space with another object.

7. The information processing device according to claim 6, wherein the circuitry is further configured to control generation of image information of the three-dimensional space after the change which is viewed from a point of view located in or in the vicinity of the replaced another object.

8. The information processing device according to claim 2, wherein the change is to change a portion of an individual object included in the three-dimensional space.

9. The information processing device according to claim 2, wherein the object includes an object corresponding to a building.

10. The information processing device according to claim 1, wherein the change includes a change in the three-dimensional space from the three-dimensional space corresponding to first time to the three-dimensional space corresponding to second time.

11. The information processing device according to claim 1, wherein the first image information is map information of the three-dimensional space corresponding to the position and the orientation, the change is to maintain a first region including a position corresponding to the position in the three-dimensional space, and simplify a second region other than the partial region in the three-dimensional space, and the second image information is map information of the three-dimensional space after the change corresponding to the position and the orientation.

12. The information processing device according to claim 11, wherein the first region is determined based on a history of accumulated positions of the terminal device.

13. The information processing device according to claim 1, wherein in an event, the change is to change a point of view for generating the image information of the three-dimensional space, the first image information is image information of the three-dimensional space which is viewed from a first point of view corresponding to the position and the orientation, and the second image information is image information of the three-dimensional space which is viewed from a second point of view corresponding to the position and the orientation.

14. The information processing device according to claim 13, wherein the first point of view and the second point of view are located at different heights.

15. The information processing device according to claim 14, wherein one of the first image information and the second image information is image information of a two-dimensional map of the three-dimensional space, and the other of the first image information and the second image information is image information of a three-dimensional map of the three-dimensional space which is viewed from a point of view located in the vicinity of a height at which the terminal device is assumed to be located.

16. The information processing device according to claim 14, wherein one of the first point of view and the second point of view is a point of view located in the vicinity of a height at which the terminal device is assumed to be located, and the other of the first point of view and the second point of view is a point of view located higher than the point of view located in the vicinity of the height at which the terminal device is assumed to be located.

17. The information processing device according to claim 13, wherein the circuitry is further configured to control generation of image information of the three-dimensional space which is viewed from at least one different point of view which is passed during transition from the first point of view to the second point of view.

18. A non-transitory computer-readable medium having stored thereon a set of computer-executable instructions which when executed by a computer cause a computer to perform operations comprising:

controlling generation of image information of three-dimensional space based on position information indicating a position of a terminal device and orientation information indicating an orientation of the terminal device; and obtaining a request for a change related to the generation of the image information, wherein the generation is controlled in a manner that first image information of the three-dimensional space corresponding to the position and the orientation is generated, and in an event obtaining the request, the generation is controlled in a manner that second image information of the three-dimensional space corresponding to the position, the orientation, and the change is generated, wherein the change is a change in all or a portion of the three-dimensional space, and wherein the first image information is image information of the three-dimensional space which is viewed from a point of view corresponding to the position and the orientation, and the second image information is image information of the three-dimensional space after the change which is viewed from the point of view.

\* \* \* \* \*